United States Patent
Heileman et al.

(10) Patent No.: US 9,805,172 B2
(45) Date of Patent: Oct. 31, 2017

(54) SYSTEM AND METHODS OF RESOURCE USAGE USING AN INTEROPERABLE MANAGEMENT FRAMEWORK

(75) Inventors: Gregory L. Heileman, Albuquerque, NM (US); Pramod A. Jamkhedkar, Albuquerque, NM (US); Christopher C. Lamb, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 1231 days.

(21) Appl. No.: 13/510,088

(22) PCT Filed: Nov. 17, 2010

(86) PCT No.: PCT/US2010/057009
§ 371 (c)(1),
(2), (4) Date: May 16, 2012

(87) PCT Pub. No.: WO2011/062973
PCT Pub. Date: May 26, 2011

(65) Prior Publication Data
US 2013/0019002 A1   Jan. 17, 2013

Related U.S. Application Data

(60) Provisional application No. 61/281,414, filed on Nov. 17, 2009, provisional application No. 61/388,815, filed on Oct. 1, 2010.

(51) Int. Cl.
*G06F 21/10* (2013.01)
(52) U.S. Cl.
CPC ...... *G06F 21/10* (2013.01); *G06F 2221/0759* (2013.01)

(58) Field of Classification Search
CPC ...... G06F 21/10; G06F 21/62; G06F 21/6236; G06F 21/6218; G06F 17/30843; H04N 7/173; H04N 21/4627
See application file for complete search history.

(56) References Cited

U.S. PATENT DOCUMENTS 5,204,897 A * 4/1993 Wyman ............... G06F 21/10
705/59
2007/0156601 A1 7/2007 Brew et al.
(Continued)

FOREIGN PATENT DOCUMENTS

KR   10-2009-0032217   4/2009

OTHER PUBLICATIONS

Press Release: 'Beep science and INKA entworks offer interoperable DRM solution for PCs, mobile phones, MP3 and Personal Media Players (PMP)', Feb. 13, 2006.
(Continued)

*Primary Examiner* — Eleni Shiferaw
*Assistant Examiner* — Paul Callahan
(74) *Attorney, Agent, or Firm* — Valauskas Corder LLC

(57) ABSTRACT

Generic rights expression language allowing interoperability across different computing environments including resource usage of different applications. A formal framework for usage management provides scaffolding upon which interoperable usage management systems can be built. Certain features of the framework are standardized, such as the operational semantics, including areas free of standards that necessitate choice and innovation to achieve a balance of flexibility and usability for interoperability in usage management systems.

11 Claims, 10 Drawing Sheets

Usage Management

(56) References Cited

U.S. PATENT DOCUMENTS

| | | | |
|---|---|---|---|
| 2007/0156603 A1 | 7/2007 | Yoon et al. | |
| 2007/0204078 A1* | 8/2007 | Boccon-Gibod | G06F 21/64 710/54 |
| 2008/0046758 A1 | 2/2008 | Cha et al. | |
| 2010/0169977 A1* | 7/2010 | Dasher | G06Q 20/3674 726/26 |

OTHER PUBLICATIONS

Barbosa et al., 'A scalable platform for context-aware and DRM-enabled adaptation of multimedia content', ICT-Mobile Summit 2008 Conference.

Diehl, 'A four-layer model of security of digital rights management', DRM'08 In proceeding of: Proceedings of the 8th ACM Workshop on Digital Rights Management, Alexandria, VA, USA, Oct. 27, 2008, pp. 19-27.

Garcia et al., 'A Web Ontology for Copyright Contracts Management', International Journal of Electronic Commerce, vol. 12, No. 4, Summer 2008, pp. 99-114.

Greer, 'Digital rights technology sparks interoperability concerns', vol. 37 Issue 12, Dec. 2004 pp. 20-22.

Heileman et al., DRM Interoperability Analysis from the Perspective of a Layered Framework, DRM' 05, Nov. 7, 2005, pp. 17-26, Alexandria, Virginia Link: http://www.ece.unm.edu/~drake/products/ACM_DRM_05_paper.pdf.

Serrao et al., 'Interoperability mechanisms for registration and authentication on different open DRM platforms', IJCSNS: International Journal of Computer Science and Network Security, vol. 6, No. 12, Dec. 2006, pp. 291-303.

Waters et al., 'Global interoperability using semantics, standards, science and technology', Computer Standards & Interfaces 31 (2009) pp. 1158-1166.

\* cited by examiner

Usage Management

CONTEXT INSTANCE

USAGE CONTROL SPECIFICATION TYPES USING DIFFERENT LOGICS

SYSTEM AND METHODS OF RESOURCE USAGE USING AN INTEROPERABLE MANAGEMENT FRAMEWORK

STATEMENT CONCERNING FEDERALLY SPONSORED RESEARCH

This invention was made with government support under DE-AC04-94AL85000 awarded by the US Department of Energy (DOE)/Sandia National Labs. The government has certain rights in the invention.

FIELD OF THE INVENTION

The present invention relates generally to computing environments, and more specifically to managing the usage of resources including data across and within computing environments.

BACKGROUND OF THE INVENTION

It is desirable to increasingly use resources in innovative ways, and further in open, distributed environments such as the Internet. Traditionally, usage policy specifications are controlled by the owner of the computing environment. The use of resources is generally restricted to closed computing environments that are managed by a single entity. However, with the increased use of Web 2.0 applications on the Internet, these restrictions no longer hold.

The term "Web 2.0" commonly refers to websites including applications that facilitate interactive information sharing, interoperability, and collaboration on the World Wide Web. A Web 2.0 website provides users with the option to interact or collaborate with each other in a social media dialogue of user-generated content in a virtual community known as an "open environment". In contrast, a "closed environment" is one where users are limited to the passive viewing of content that was created for them. Examples of Web 2.0 websites include social-networking sites, blogs, wikis, video-sharing sites, hosted services, web applications, folksonomies and mashups.

Computing environments within which resources are used are no longer fixed, allowing resources to often move across multiple computing environments. This has led to problems, where resource owners demand that they hold the right to express the resource usage policy, rather than the owners of the computing environments. This trend is increasingly observed in usage management of commercial content, medical information and financial data. The advances made in using resources, such as mashups, aggravates this situation further. In order to address this problem, it is desired to have mechanisms that allow specification of usage policies that can be interpreted and enforced across multiple different computing environments.

Conventional designs in this area have been directed towards developing more expressive language by using either a different type of mathematical logic or formalism with greater reasoning capability. Such advancements, even though useful in closed systems, fail to address the problem of an interoperability challenge posed by open environments. The solutions that have tried to address interoperability have often resorted to translation mechanisms, where the entire policy is translated to a different language. Such translations are often infeasible, and difficult to carry out for most of the policy languages.

Other approaches to the problem have led to the development of complex policy specification languages that have tried to establish themselves as the universal standard. Such approaches require standardization of the complete policy language, which stifles innovation and flexibility.

The term "usage management" as used in the present application describes the management of resource usage within a given system. The historical development of usage management is discussed followed by the scope and constituent elements of usage management, tracing its origins to access control, digital rights management and the challenges that result from the evolving nature in which data and information is being used across systems.

Access control mechanisms are systems that manage controlled access to resources. The central idea behind access control is to grant access to a resource depending upon subject attributes, object attributes, and system attributes. The central component of any access control system is an Access Control Language ("ACL") used to express rules for granting access to different resources in the system. Access control policies can be categorized into two types, namely, Discretionary Access Control ("DAC") and Mandatory Access Control ("MAC"). DAC policies are the policies that are specified by the owner of the resource, based on the users' attributes. MAC policies are made by a central authority and apply to the whole system. A number of access control models have been developed that allow different types of access control in these two models. The most successful ones being the Role-Based Access Control model ("RBAC"), and the Bell and LaPadula model.

The focus of access control models is to capture the different types of relationships between and among a set of resources and a set of users, and express access rules based on those relationships. Access control mechanisms are generally tightly coupled with the system in which they are deployed. In situations where users' identities are not known a priori, a system agnostic authentication mechanism, such as the public key infrastructure, is used.

Digital Rights Management ("DRM") consists of mechanisms that manage controlled usage of digital resources. The central idea behind DRM is that usage rules for a given resource are specified for a particular user or group of users, and the use of the resource is subsequently managed for a finite period of time. The usage rules generally include a set of permissions and obligations, along with rules specifying how the permissions may be exercised over a period of time and under what circumstances. DRM also includes mechanisms such as trusted computing that ensure the enforcement of rights on the user machines. The most well-known, but unsuccessful, approaches to address this problem are IBM's® Cryptolope and Microsoft's® Palladium technologies. Given the problem of enforcing DRM, there have been proposed incentive based, game-theoretic approaches for DRM. The central component of DRM systems is a Rights Expression Language ("REL") that is used to express usage rules (or rights) in the form of a license that is generated by a resource owner for a user or a group of users that uses the resource.

Some of the earliest attempts at DRM involve the development of a formal language for legal discourse. At present, creative commons, along with two XML-based RELs, namely, eXtensible Rights Markup Language ("XrML") and Open Digital Rights Language ("ODRL"), are most commonly used. Semantics of these XML-based languages are informal. A number of approaches using various types of formalisms and approaches have been used to develop formal RELs. Some have used trace-based semantics to develop formal RELs. Other formalisms such as first-order logic and CafeOBJ have been used to develop RELs. Others have attempted to provide formal semantics for existing XML based RELs. However, popular XML-based RELs are difficult to formalize in their entirety.

Others have tried to expand the concept of DRM to propose concepts including usage rights management and usage control. The idea of usage rights management is developed along the lines of making users aware of how a resource is supposed to be used. A more formal framework such as Usage Control that based on Authorizations, oBligations, and Conditions ("UCONABC") combines access control and permissions and obligations in a single model. There are challenges in implementing usage management systems, and the need for an actionable framework for addressing the challenges.

There are differences between ACLs and RELs. Even though the goals of these two types of languages overlap, the focus of study in ACLs and RELs is significantly different. ACLs focus on defining access rules in terms of relationships between a set of resources and a set of users. In DRM systems, once a user obtains a license for a resource, access to that resource is implicit, and what matters is how that resource is used from that point onwards. RELs focus on defining different types of usage rules for a given user (or group of users) over a given resource (group of resources).

Unlike classical access control systems, information is increasingly used across highly networked, distributed computing environments that are not a part of a single centrally managed system. In addition, digital information is increasingly used in innovative ways in which it is transformed, processed or merged with other information while being used across computing environments. One such example is the mashup process where information from two or more separate sources is merged to generate a new information source. This necessitates usage management policies to be tightly coupled with the resource, rather than the system. The policy is then interpreted and enforced as the resource moves across different computing environments.

One approach to this problem is to build an interpreter for the policy language that runs on the computing environment such as the client, and enforces the policy on the client. This approach has been used for access control systems, because access control policies are tightly coupled with computing environments whose nature is known a priori. However, in usage management scenarios where resources move across environments that are not known a priori, such an approach is infeasible. To address such a situation, each of the computing environments must incorporate an interpreter and enforcement mechanism that is custom built for different policy languages.

One proposed solution to this situation is the use of a standard usage policy language for all types of information management ecosystems. Rights expression languages such as XrML and ODRL have been adopted separately as standards by different industry alliances. The semantics of these XML-based languages are informal, and there are problems involved in providing formal semantics for these languages.

Numerous formal logic-based rights expression languages have also been developed. These languages use different types of mathematical logics to express and reason over various types of usage semantics. Both XrML and ODRL have developed and continue to develop independent of these formal languages, and have not been able to incorporate their expression and reasoning power. For these reasons, none of these languages are likely to become the de facto industry standard in the future. Different information ecosystems continue to use different policy languages according to the policy expression requirements. Such a fragmented use of policy languages remains the biggest obstacle to achieving usage management along with unhindered flow of information across highly distributed computing environments.

The existence of multiple policy languages in such scenarios poses two problems, namely, difficulty supporting multiple languages and lack of interoperability. If a given computing platform that intends to be a part of multiple information ecosystems, it must support the policy languages used by each of these ecosystems. This means that policy language interpreters for each of these policy languages need to be custom built for that particular computing platform. Furthermore, any advances or changes that are made in these policy languages require corresponding updates in the interpreters used in the computing platform.

Another disadvantage is that even though a given computing platform may support multiple information ecosystems, each of these information ecosystems still operates in complete isolation from one another. Since different ecosystems use different policy languages, licenses expressed within one ecosystem cannot be interpreted in another ecosystem. This prevents resources from moving freely across different ecosystems.

The most common approach to interoperability has been translation mechanisms which translate a policy from one language to another language. It is, however, extremely difficult to translate policies from one policy language to another. The Coral and Marlin initiatives have provided architectural solutions to DRM interoperability. In the Coral approach, different licenses for different DRM systems are generated from a common token in accordance with a common ecosystem. In the Marlin approach, licenses are expressed programmatically in the form of control objects to prevent dependence on any one particular REL. Both Coral and Marlin architectures focus on the management of licenses across systems.

A license is a flexible vehicle that can be used in different situations such as access control systems, rules for content usage in digital rights management systems, specification of rules for missile launching systems, rules governing usage of medical records, and other such applications which necessitate controlled behavior. It is necessary to have a license structure that captures the range of license applications. In addition to the complexity of a license, it may vary depending on the applications. For example, a license can be as simple as an access control matrix or a license may involve complex semantics such as permissions, obligations, partial dependencies, parallel executions, interleaving semantics, management of state changes, etc.

While many applications do not require most of these semantics, certain applications may require specialized semantics that are different than the ones mentioned above. To capture each of these semantics, specialized logics have been developed that allow expression and reasoning over the concepts. For example, deontic logic captures the deontic concepts such as permissions and obligations, temporal logic allows reasoning over traces of activities, and dynamic logic allows reasoning over state changes. Different rights expression and access control languages have been developed that are able to expresses and reason over some of these semantics, but currently there is no single logic that can capture all of these semantics.

While there are many access control and rights expression languages with varying capabilities, using these languages in different applications presents the problem of interoperability. Typically, restrictions specified licenses are context specific.

Other issues arise with respect to mashups. The term mashup is used to describe a web application that combines data or functionality from two or more external sources. Mashup services are currently playing a vital role in the evolution of Web 2.0 applications. However, a number of problems are also emerging with respect to managing the rights associated with the constituent parts of a mashup, along with the rights that should be assigned to the resulting mashup service itself.

The resources made available through the programmable web are being used in increasingly sophisticated ways in order to provide useful results. For example, it is now possible for a website to contain news headlines, weather, blog entries, etc., each automatically delivered from external web services. Furthermore, applications that mashup geo-location and mapping services from external Internet providers with a company's own data are now common. That is, a mashup is created by aggregating data from different sources in presumably interesting ways. Mashups are a key capability associated with Web 2.0 applications, which are infrastructures currently emerging on the Internet.

Recently, a number of difficult issues have arisen regarding how the data associated with mashups can be used. For instance, because mashups generally involve the combination of someone else's data in order to create a new source of information, a number of ownership and copying issues occur. These include the agreements that are connected with the use of mashup sources, and protection of the intellectual property associated with a provider's proprietary information presented in a mashup, as well as new proprietary rights that arise when creative works are compiled in a mashup. In addition, there are a number of more obscure issues that arise in mashups. For instance, users may request warranties for the accuracy of mashup content. There are also questions regarding who is ultimately responsible for the content in a mashup.

Mashups may also present problems related to privacy. For instance, one website demonstrates that by combining two commonly available pieces of information, namely the current location of an individual, along with that individual's household address, such combination may allow someone to easily ascertain when that individual is away from their residence.

Currently many of the resources available via the programmable web for combining in a mashup have some terms of use or a license agreement associated with them. For example, Flickr™ associates a creative commons license with the content it delivers, and users must first agree to the terms of use before obtaining an Application Programming Interface ("API") key allowing them access to Google® Maps. Indeed, if a mashup application is simply consuming the raw Hypertext Markup Language ("HTML") returned by addressing some public website, there are typically terms associated with using this HTML. If an API is provided in order to obtain data from some web service, then typically one must first agree to the terms of use for the service, prior to obtaining an API key that is used for authentication. When accessing the service, the application must also supply the API key, and the resource is only delivered to the application if its domain matches the one associated with the key.

Because any addressable resource can be included in a mashup, anyone that maintains a website that can be accessed by the general public is at risk to the problems described above. Many of the above issues deal with how the data associated with mashups can be used. That is, they deal with the problem of managing property rights over mashups.

Recently, there have been a number of papers that consider security issues related to mashups. For instance, a number of groups have investigated the problem of cross-domain scripting in mashups. This problem arises from the browser security model that is used in typical mashups, allowing the scripts associated with a mashup source to change the data that was supplied by other mashup sources. Architecture was proposed that considered how to support authentication and authorization when dealing with non-public data in mashups. In this case, an API was provided that authenticated a user via OpenID, prior to providing data to that user.

There are different types of mashups that exist. In a client presentation mashup, the mashup program receives formatted HTML from data sources, often called widgets, and plugs them into the mashup program's web pages. A mashup editor is a tool that is typically used to create these mashup applications. In one example, a URL Builder module is used to create a query to a website. A text input is "wired" to this module in order to provide the search term, and then a number of additional modules are connected in order to filter the search results according to the user's criteria.

In client service mashups, the mashup program receives data from different sources. However, these sources are processed within the browser using JavaScript prior to presenting the mashup information to the end user. Finally, in external service mashups, a server collects data from different sources, and then processes it using a scripting language such as Ruby, PHP or Python, prior to presenting the mashup information to the end user.

FIG. 16 is a flowchart depicting steps that are typically taken in a conventional Internet environment to create a mashup. Typically, access to a particular source data is provided through an API. However, a user must first register with the provider in order to use an API. In the case of client presentation mashups, the creator of the mashup program may assume this responsibility. In the case of client or external service mashups, the mashup creator is typically asked to fill out an application that asks for the domain from which the API is accessed. In addition, the mashup creator must agree to the terms of service for the API, which often include various stipulations on how the data and service may be used as shown by 10. The provider then supplies a key 12 at each source 14 to the mashup creator 16 that can be used to gain access to the API from within the mashup creator's domain. Next, a mashup program that uses the API may be created. This is typically accomplished through an HTTP request 18. The mashup creator supplies a key with this request, and either data or javascript code that can be included within the mashup creator's application is returned 20 to the mashup creator 16. The mashup data is then provided 22 to the web browser 24.

It can be seen that the mashup scenario lacks one of the fundamental properties associated with digital rights management, namely machine actionability. Although it is common for there to be a large number of usage terms associated with the streams used in mashups, because they are not generally express using any type of REL, human intervention is required to interpret and perform any rights-related actions. Furthermore, this problem is difficult to address, as it cannot be solved by simply adopting a rights expression language for a given source. The very nature of mashups is that they may include sources from many different types of origins, and the sources may be used in ways that the originators of the sources did not initially anticipate. Thus, all sources cannot be expected to adopt a single REL. Rather, if a source even uses a REL, it should be expected to be different from the ones used by other sources. For instance, a mashup program might expect to encounter license agreements that make use of XrML, ODRL, Creative Commons, or the GNU General Public License.

Another problem relates to where rights should be managed within the mashup framework. After usage terms have been agreed to, they are effectively disassociated from the content. The owner of a particular source would like to continue to assert rights over how the source is used. However, the owner must now rely upon the owner of the mashup program to do this. In order to grasp the depth of this problem, consider FIG. 17. FIG. 17 demonstrates a mashup program 26 that replaces the web browser 24 of FIG. 16 and makes use of data provided by another mashup program 16 (see also FIG. 16). The mashup program 26 also receives data from other sources 28, and outputs mashup data 30. In this scenario, the initial mashup 16 (see also FIG. 16) becomes the effective owner of the resource, and the creator of this mashup must decide what restrictions and usage terms should be applied. This approach is fundamentally flawed, as the rights and usage terms should flow from the original sources, as the owners of these sources should have every right to assert them.

In order to address the problem of rights disassociation, it becomes necessary to compute the resulting rights that emerge from the initial mashup program 16. However, as the number of sources and the level of mashing increase, the complexity of computation associated with determining the unified set of rights associated with the target grows in a manner that is likely to be exponential. Furthermore, for a typical set of usage terms, it immediately becomes apparent that it is difficult to simply reason over the combined set of rights. For example, the terms of service associated with each API are thousands of words. Thus, even for a mashup involving a relatively small number of sources, simply determining whether or not the license terms of two or more providers conflict with one another is an extremely difficult task.

Moreover, the terms themselves can be complicated. For instance, some of the usage terms associated with the Google® Maps API include that a user cannot require a fee-based subscription for access to any site that uses Google® Maps, the user must display a link to the Google® Maps terms of use, a user must not modify the map data itself, the map data can only be used in a web browser, a user may not offer a batch geocoding service built using the Google® geocoding service, a user must not have the Google® logo as the largest on their website, and a user must not display a Google® Map if the site contains adult content. Understanding the meanings of these usage terms, along with their context and how they might be combined, is a challenge in and of itself.

In order for a computer to "understand" the context in which usage terms are being provided, an ontology must be supplied. This allows computers to reason over rights scenarios in mashups in order to answer questions such as whether the rights associated with different sources can be satisfied. For instance, a determination may be made regarding the following: whether the rights are defined consistently with respect to one another, whether the assumptions associated with a first source are consistent with assumptions in other sources, and whether different environments are conformal. For example, the concept of loaning a content object in an e-book environment may not have an analogous action in an environment dealing with corporate documents.

Therefore, there is a need for a system and method that allows resource usage to be utilized across and within computing environments including the use of different applications across and within different environments. The present invention satisfies this demand.

SUMMARY OF THE INVENTION

The present invention is a system and methods for resource usage across and within computing environments. For purposes of this application, the term "resource" includes any form and content of data and information.

The present invention applies principles of system design to develop a framework for usage management in open, distributed environments that supports interoperability. These principles achieve a balance between interoperability and open, flexible architectures. Certain features of the framework such as the operational semantics are standardized, which leaves free of standards features that necessitate choice and innovation. After the description of the framework, a calculus is defined that provides a platform upon which different usage control specification languages can be developed without concerns about system specific challenges. These languages may be used to generate smart licenses that may interoperate with different computing environments.

One of the features of the calculus is to incorporate and formalize the notion of interoperability. This feature is essential for automated use of licenses across different computing environments such as intranets and home networks. The present invention uses dynamic interpretation, which refers to policies being dynamically interpreted, and a given policy may be interpreted in multiple ways within the same computing environment.

The present invention may create generic license language for use in DRM. Generic rights expression language allows interoperability across different applications and environments.

In one embodiment according to the present invention, context is modeled as an abstract entity with a finite set of properties. The context is divided into environment, subject and resource and each of the properties is determined. Once a license is identified, the structure of the license is designed. Appropriate architectural spaces are created for specification of one or more semantics of the license. The structure of the license is divided into a context specific part and a context independent part and a standard interface by means of which an enforcement mechanism communicates with the license is provided. Hierarchies of contexts, license interfaces, and enforcement mechanism interfaces are defined and constraints of the license in terms of context properties are constructed. Finally, the license is enforced.

One advantage of the present invention is that it may provide conceptualization of a license as an object with an interface. Another advantage is that is provides separation of access control and usage control specification. Yet another advantage is that it facilitates the creation of design space for access control specification and usage control specification to allow the use of choice of use of appropriate logic for Access Control Language ("ACL") and Usage Control Language ("UCL") according to the need of the application.

Another advantage of the present invention is that it allows the development of contexts and licenses in a hierarchical structure to allow inheritance of complex contexts and licenses from abstract base context and license respectively. The hierarchical structure dynamically determines interoperability of licenses and enforcement mechanisms. Another advantage is that the separation of usage control and access control provides flexibility to allow the use of choice of logic to be used for usage control specification and access control specification. Hence, depending on the need of the application, a license may use a choice of appropriate logic. Yet another advantage is that the separation of license expression and interpretation is dynamic in that it allows the same license to be interpreted differently in different enforcement mechanisms, it also allows the same license to be interpreted differently as time progresses, and it also allows the same license to be interpreted differently in different situations. Such flexibility provides advantages over the current scenario where licenses are interpreted statically.

Another advantage of the present invention is a dynamic interoperability check provides the flexibility of not needing to pre-configure systems for compatibility checks. This is an important aspect in terms of interoperability, along with the separation of license expression and interpretation. Yet another advantage is that it provides a definition of contexts and licenses in hierarchies' inheritance of licenses and contexts from an abstract base license and context, respectively. This provides the flexibility in terms of creation licenses according to the need of different applications.

A further advantage is that the flexible and dynamic properties allows the present invention to be used in a variety of contexts and applications such as: expression of digital rights, access control specification, usage control specification, secure mashups, and action control specification where partial ordering of actions, or simultaneous execution of actions need be specified along with restrictions over the individual actions, for example, in critical applications such as missile launch control sequence specification.

The present invention and its attributes and advantages is further understood and appreciated with reference to the detailed description below of presently contemplated embodiments, taken in conjunction with the accompanying drawings.

DETAILED DESCRIPTION OF THE INVENTION

The present invention has two distinct advantages, namely, separation of access and usage rules, and formal semantics for interoperability. In the license structure, a design space is created for access and usage rules. In currently used policy languages, these two aspects of usage control specification are incorporated within a single policy language. However, it is difficult to create a universal policy language that is able to express all types of usage semantics, and also incorporate access rules.

Figure 1:
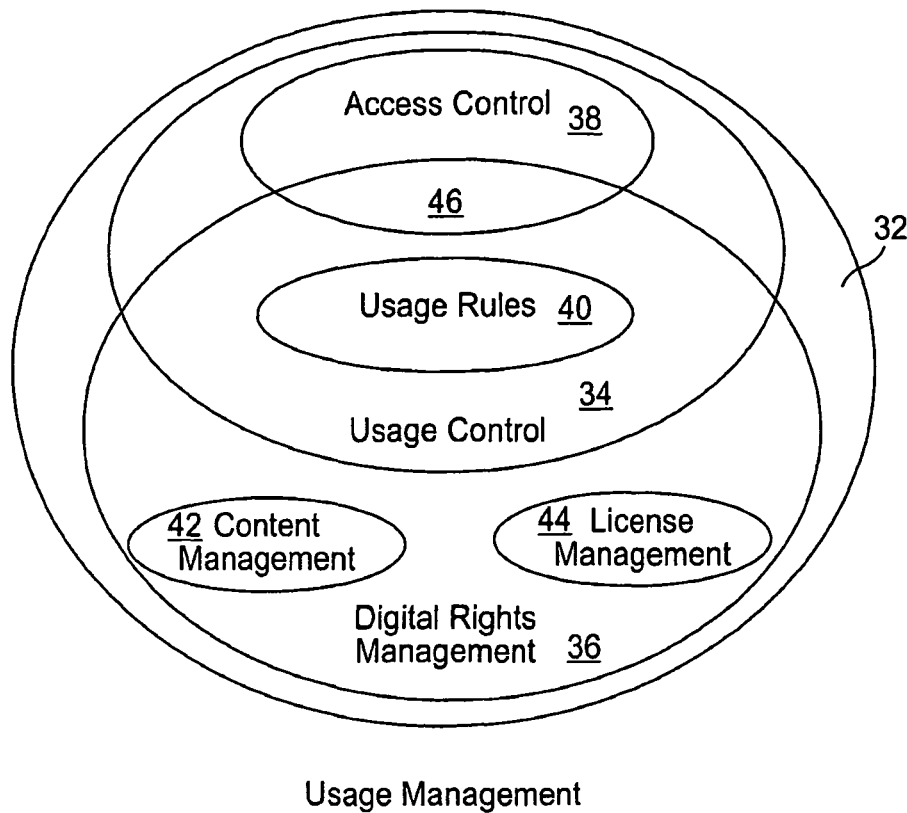
FIG. 1 illustrates a diagram of primary elements in one embodiment of a usage management system according to the present invention.

The components of usage management 32 and how they relate to each other are shown in FIG. 1. Usage management 32 is a combination of usage control 34 and DRM 36. Usage control 34 is a combination of access control 38 and usage rules 40. DRM includes content management 42, license management 44, specification of usage rules 40 and a simplified subset of access control 46. Content management 42 and license management 44 include processes that manage how content and a license are bundled, encrypted and distributed or managed across multiple clients. These processes include encryption mechanisms, trust management, trusted computing platforms and other such management techniques. Many RELs, including XrML and ODRL, have tried to incorporate these functionalities.

The present interoperable framework for usage management, unlike conventional Coral and Marlin architectures, provides a formal calculus to reason about the relationship between a license, a computing environment, and interoperability between them. The proposed framework incorporates programmable licenses and common ecosystems. The design choices for the framework is based upon the following guidelines: information ecosystems operate across highly networked, distributed, diverse computing environments; resources move across these computing environments as well as different information ecosystems, and for a content ecosystem the set of rules and rights models that develop around particular content types are defined, for example, music, ebooks, software; multiple information ecosystems continue to use different policy languages, depending on the types of rules and rights models required for expressing their respective policies; and no single policy language is able address the policy expression requirements of different information ecosystems. Policy languages continue to change and evolve using different logics to express various usage semantics. These assumptions combined with other assumptions form the basis for the design of the usage management framework. A meta-model is provided for the disclosed framework.

Figure 2:
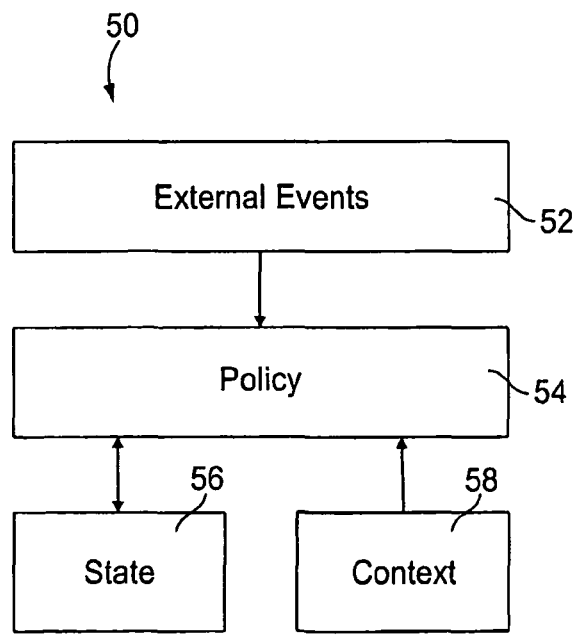
FIG. 2 illustrates a block diagram of one embodiment of a meta-model for usage management according to the present invention.

The meta-model for usage management 50 shown in FIG. 2 is now described. The meta-model 50 illustrates a high-level abstraction for the manner in which usage control, access control and DRM policies operate. Design choices are discussed with respect to this meta-model. The meta-model consists of four entities, namely, external events 52, policy 54, state 56 and context 58. The entities are explained below.

External events 52 represent events that take place within the computing environment wherein usage management is being carried out. External events 52 are, however, restricted to only those set events about which the policy is aware of and can reason over.

A policy 54 describes the rules that govern the manner in events must occur within a computing environment. The policy state maintains a state that records the past events which have occurred in the computing environment. A policy 54 may have many responsibilities, however, the primary responsibility of a policy is to determine whether or not a set events can be allowed to occur. A policy 54 makes this decision based on three parameters, namely, the set of events in question, the current state of the policy, and the context 58 under which the events are going to take place.

Every event in the computing environment takes place within a context 58. Context 58 captures the circumstances under which an event occurs within a computing environment. For example, consider the event of opening of a file. In this embodiment, the context 58 captures information such as the properties of the agent who carried out the act, the properties of the file over which the act was carried out, and the environmental circumstances including the time, date, and location when the event occurs.

A meta-model can be viewed in terms of three different dimensions along which it is instantiated by different usage management mechanisms. These dimensions are structural, operational and deployment. The structural dimension defines the manner in which policy 54, context 58 and state 56 are structured. The operational dimension defines the manner in which the model operates. The structural and operational dimensions of a model are often tightly coupled and difficult to differentiate. The deployment dimension identifies the manner in which the model is deployed in the form of a working system. The properties of the above dimensions are not mutually exclusive and sometimes overlap. The dimensions merely provide a guideline to understand and analyze existing systems. Every usage management system makes choices along these dimensions in accordance with the system requirements.

The structural dimension of the model captures the structure of the context, state, and policy language. The context structure determines the entities included in the context, properties of these entities and relationships among these entities. Most of the policy languages have included entities such as subject, object and computation platform for modeling contexts. Languages that deal with DRM have a more complex structure in order include additional entities such as licensor, rights holder, licensee, and other rights management terms. The structure of the state is another aspect of the structural dimension. Different models and policy languages follow different ways of maintaining policy state. In the UCON model, the state is maintained in terms of variables that represent mutable subject and resource attributes. In XrML, the same functionality is achieved by means of a StatefulCondition extension, which maintains external state variables that allow one to maintain the state of the license. Logic-based RELs maintain policy state as a sequence of events. The third aspect of structural dimension is the policy language that is used to express the policy 54. The syntax and semantics of the policy language are generally dependent on the structure of context 58 and state 56. These three components together define the structural dimension of a particular usage management model.

The operational dimension to a large extent depends on the type of policy language adopted by the usage management system. Operational dimension reflects the manner in which a policy collects information, provides results and updates policy state. For example, context values and current state can be checked by the policy before the event occurs or while the event is occurring. Similarly, the policy state can be updated before, during, or after the event has occurred. Validation of context after an event has occurred is not a realistic scenario. Depending on the policy language, a usage management system may support one or more operational modes.

There are many ways in which a given model can be deployed in order to develop a working system. For example, the complete working of the model can be programmatically hardwired into the system. Such an approach is generally used when policy does not change very often. The most common approach for deployment is to design a policy language that allows different policies to be expressed, and the interpreter for that language resides on the client computing platform where policies are enforced. Policy languages such are XrML and ODRL are usually deployed using this method, even though it is possible to use other approaches. Another approach used by Marlin interoperability framework makes use of programmable licenses. In this approach, instead of having an policy language interpreter on every client, the rights are expressed in terms of a control program. Each approach has its own system-level advantages, disadvantages and challenges.

The usage management framework of the present invention may be defined in stages. The first stage includes the deployment mechanism of the framework. At this stage the structural and operational dimensions of the framework are left free of standards. This means that the usage management framework can be implemented by using any given choice of structures for policy, state and context. In addition, the framework can operate in any operational mode. The operational and structural dimensions of the model may be later fixed. A model can be adopted that uses a particular structure for the license and context, along with a particular type of operational mode, and based on this choice it is possible to reason about interoperability.

The usage management framework involves usage policies, expressed in the form of a license, that are interpreted and enforced within a computation environment. In order to simplify the understanding of the framework, usage management is divided into two stages, namely, the setup stage and the working stage. The setup stage includes the process of setting up the computation environment and the generation of a license. The working stage includes the process of license interpretation and license enforcement within the computation environment.

Figure 3:
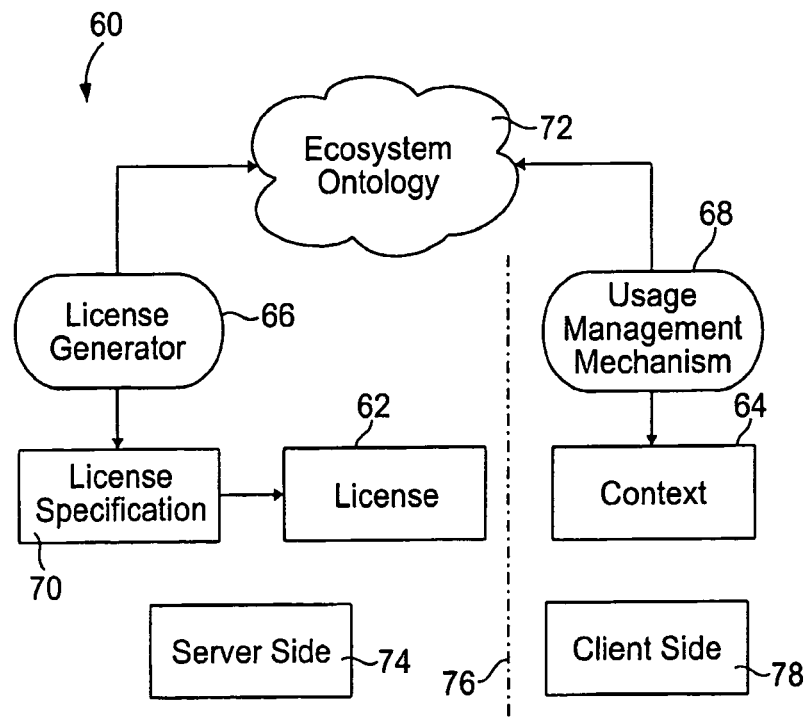
FIG. 3 illustrates a block diagram of a setup stage for usage management according to an embodiment of the present invention.

The setup stage involves the generation of a license object and a context objects. Both license and context objects have a behavior, maintain an internal state and a standard interface. The setup phase 60 is shown in FIG. 3. More specifically, FIG. 3 shows two entities, namely, license 62 and context 64 being created by the license generator 66 and usage management mechanism 68, respectively. A license generator 66 is a program that allows a resource owner to express licenses 70, and is provided on a server side. The usage management mechanism 68 is a program that manages usage on the client machine. Specifically, the usage management mechanism 68 allows the use and query of licenses through a standard interface that is agreed to a priori with the client. In one embodiment, the standard interface may be a web application that is accessed over a network such as the Internet or an intranet, or a web application that is hosted in a browser-controlled environment. The license generator 66 and usage management mechanism 68 use a common ecosystem ontology 72 to create context and license.

The system of the present invention operates with a server computer 74 that has components on the server side—left side of dashed line 76—and a client computer 78 on the client side—right hand side of the dashed line 76). Each of the license 62, license specification 70, license generator 66 and ecosystem ontology 72 components operate with the server computer 74. Similarly, each of the context 64, usage management mechanism 68 and ecosystem ontology operate with the client computer 78.

An agreement on the terms expressed in the license and the terms defined within the computation environment should exist in order for a license to be interpreted within a computation environment. Therefore a common ontology 72 may be used for the creation of both a license 62 and a context 64 in order for them to be interoperable. An ontology 72 defines a common vocabulary for agents or programs that need to share information in a domain, and includes machine-interpretable definitions of basic concepts in the domain and relations among them. The ecosystem ontology 72 represents the domain of the computational environment. A common ontology 72 is desirable for an agreement over the vocabulary and structure of computation environment. The existence of a common ontology 72 used for the creation of license 62 and context 64 forms the basis for interoperability support within the framework.

A context is a formal representation of a computation environment. A context object is an instantiation of a context that captures the structure and the state of a computing environment. A context object is structured according to the ecosystem ontology 72. A context object represents the entities within a computation environment, and the relationships among these entities. For a given computation environment, each entity is defined by a set of attributes, and the context object maintains the current values for each of those attributes. The primary goal of a context object is to capture the conditions under which actions are carried out within a computation environment. A context object maintains an interface that allows the functions to update and retrieve relationships among the entities and to update, retrieve and compare the attribute values for a given entity. Depending on the type and complexity of a given context object, different types of interfaces may be supported.

The manner in which licenses are expressed and interpreted within the framework of an embodiment of the present invention is significantly different than the way in which licenses are conventionally expressed and interpreted.

In conventional rights management systems, policies are expressed within a license by means of a policy specification language. The language can either be a descriptive natural language (as in creative commons), a machine readable XML-based language (XrML and ODRL), or a logic-based language with a formal syntax and semantics. In all of these cases, the license is expressed in terms of a descriptive statement. An interpreter exists within a computation environment that understands the syntax and semantics of the descriptive license, and interprets it within that computation environment. Hence, a license is descriptive and passive, and it is the responsibility of the interpreter to interpret the license within the computation environment.

In an embodiment of the present invention shown in FIG. 3, a descriptive, passive license 62 is transformed into an executable, active license object, which is called a "smart license". A "smart license" is an executable object that has a behavior, a state, and an interface.

The behavior of a license reflects the expressive complexity of the policy the license represents. Different licenses can capture different policy language complexities. Various usage semantics, such as, permissions, obligations, temporal dependencies, partial dependencies, and interleaving semantics can be captured by different types of license objects. The operation of the framework is agnostic to the behavior of a license object which is hidden inside the license object. Thus, license descriptions from different policy languages can be transformed into license objects, and still be used within the framework.

The state of a license object captures the history of usage associated with the license. Every time usage associated with a license is performed within a computation environment, the license object updates its state to record the history. Maintaining the usage history in the form of a state within the license object is a design decision that allows managing licenses that are used across multiple computing environments, such as home networks, super distribution and mashups, and allows a decentralized approach to manage distributed environments or supply chains. Moreover, it is possible to maintain the usage history outside the license object.

Figure 4:
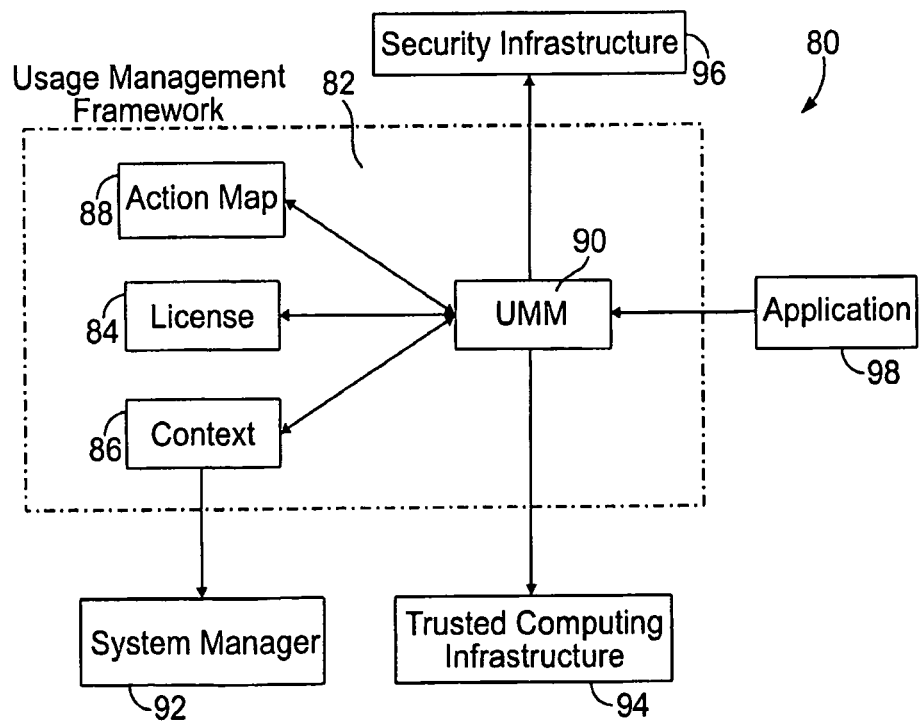
FIG. 4 illustrates a block diagram of a working stage for usage management according to an embodiment of the present invention.

The interface of a license object allows the usage management mechanism to query the license object regarding usage. Different types of license support different levels of interfaces. The "smarter" a license type, the richer the interface it supports. Some of the functions maintained by license object interfaces are: query a license regarding decisions on usage; update, retrieve or reset the state of a license; and check compatibility with another license or merge a license with another license. FIG. 4 shows the working stage 80 of the usage management framework 82 including the interactions among the various entities that operate on the client side. The working stage 80 of the usage management framework 82 involves interpretation and enforcement of a license 84 within a computing environment. The usage management framework 82 includes the action map 88, license 84, context 86 and Usage Management Mechanism ("UMM") 90. The supporting components that are external to the usage management framework 82 include the security infrastructure 96, application 98, system manager 92 and trusted computing infrastructure 94.

The usage management entities operate within the computing environment with respect to which the license needs to be interpreted and enforced. The behavior and interface of a license 84 and context 86 are explained above. The usage management mechanism 90 and action map 88 components are described below.

Usage management deals with the usage of resources within a computation environment. Different types of usages can be expressed using verbs such as "play", "view", "print", "loan", etc. When a license creator defines the usage policy, the license creator uses this vocabulary to express the policy terms. Each of these verbs has a specific interpretation depending upon the computing environment within which it is used.

In every computing environment, actions are carried out as discrete identifiable events. These events are different for each computing environment, and may depend on the type of computing platform, operating system, etc. Hence, every verb can be interpreted within a computing environment in terms of a single event or a sequence of such events. In this patent application, the term "activity" corresponds to the verbs used in a license, and the term "action" corresponds to the identifiable events in the computing environment.

The separation of verbs used in licenses and their interpretation within computing environments allows dynamic interpretation of licenses. Dynamic interpretation is next discussed.

The UMM 90 acts as a controller that manages communication within the components of the usage management framework 82 as well as communication with external services. At the same time, the UMM 90 provides an interface to the application for managing usage. Different applications can use this common interface provided by the UMM 90. On the other hand, the UMM 90 can interact with different types of licenses with standard interfaces.

A system manager 92 is a component that is responsible for providing the values of the current attributes of the system. The system manager 92 is a computation environment specific piece of software. The system manager 92 provides a service to the context object by making available the current values of the system.

The trusted computing infrastructure 94 is a service provided by the computing environment that can enforce the usage decisions provided by the UMM 90. Trusted computing infrastructure 94 is a system specific service that can enforce whether the execution of actions occurs in the computing environment.

The security infrastructure 96 includes services that allow license management. Such services allow the UMM 90 to manage authentication of users, validation of licenses, encryption and decryption of licenses, and other such license management tasks. The security infrastructure 96 is computation environment specific and provides a service to the UMM 90.

The work flow describes how information flows between the different components in a typical usage management scenario. The work flow is different from the operation mode described earlier that defines the manner in which policy decisions are carried out. In the following workflow the steps involved in a typical use-case of policy interpretation and enforcement are defined. In this workflow sequence context values are considered to be checked by the policy before the activity is carried out and a state is updated after the activity is carried out. It is possible to implement this work flow in any of the operational modes.

In a first step, the application queries the UMM whether an action (or a set of actions) is permitted or not. The application provides subject attributes and resource attributes. The UMM 90 and system manager next update the context object with subject attributes, resource attributes and the computing environment attributes. The UMM 90 queries the action map for the activity (or a set of activities) that corresponds to the action questioned by an application 98. The UMM 90 also queries the license 84 whether the activity is permitted or not.

The license queries the context object to determine the conditions under which the activity is to be performed. The conditions may include subject attributes, resource attributes, and computing environment attributes. Depending upon the usage history, and the present conditions under which the activity is to be performed, the license object determines whether activity can be permitted or not, and accordingly tells the UMM 90. The UMM 90 informs the application 96 about the decision and uses the services of trusted computing infrastructure to enforce the decision. If the action is indeed carried out, the license object is notified about the execution of the action. The license object records the event by updating its state.

The design of the model offers several advantages that address some of the well known problems in usage management systems. For example, the usage management framework provides a series of system-level advantages. The framework follows the principle of design for choice that creates design spaces that are free of standards, where innovation and choice is possible. The most important advantages of such an approach is a framework whose operational semantics are independent of computing environments and licenses. The separation of these two allows interoperability between licenses and computing platforms to be studied as a property that can be analyzed and supported within the framework in a formal manner.

In the framework of an embodiment of the present invention, the interpretation of the activities defined in a license is not fixed. The activities are interpreted in terms of the identifiable actions carried out in the computing environment. This interpretation map is independent of the rest of the functioning of the framework. Such a design choice leads to capabilities that are not possible in UMM systems that rely on static interpretation.

Figure 5:
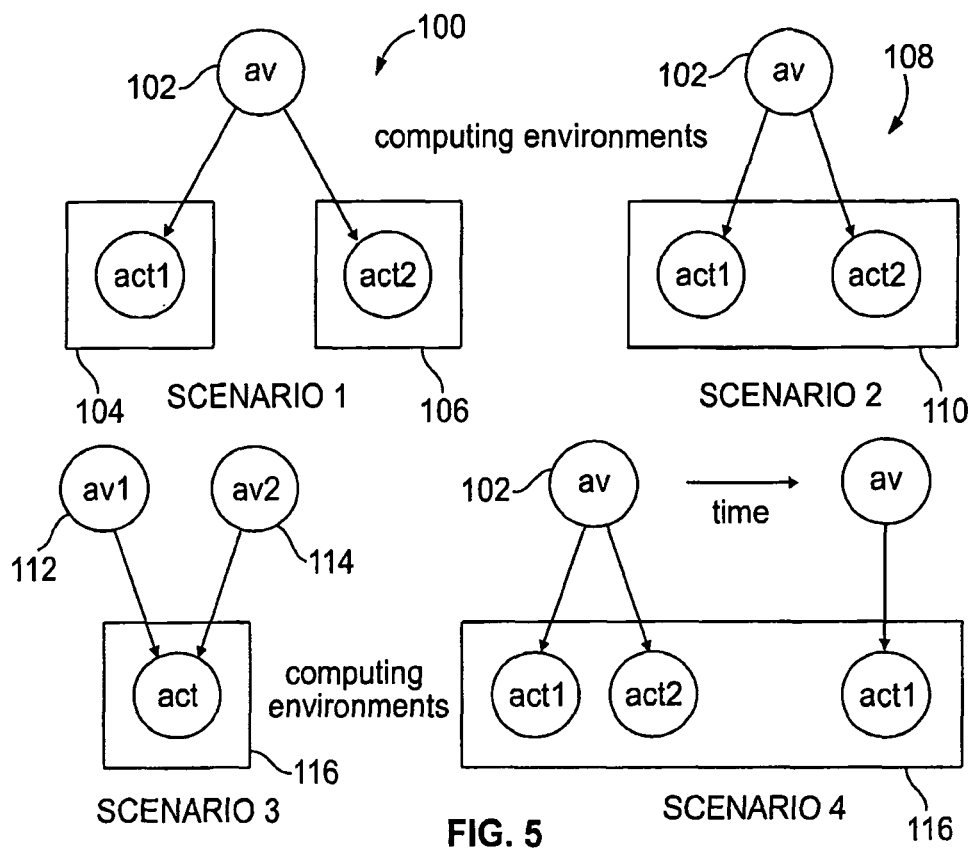
FIG. 5 illustrates a block diagram of scenarios 1-4 for dynamic interpretation of activities in terms of actions according to an embodiment of the present invention.

FIG. 5 shows different ways in which activities in a license can be dynamically interpreted. Scenario 1 shown generally as 100 shows that the same activity ("av") 102 in a given license can be interpreted differently in two different computing environments ("act1") 104 and ("act2") 106. For example, the activity "play" can have one interpretation in an iPhone® environment, and a different interpretation in a personal computer environment.

Scenario 2 shown generally as 108 shows how a given activity 102 can be interpreted as multiple actions 110. For example an activity such as "view" can be interpreted as both "openfile" and "printfile" action in a computing environment.

Scenario 3 depicts the situation where two different activities 112, 114 are interpreted as the same action in a given computing environment 116. For example, a license expressing two activities, view and play can be interpreted to imply the same action openfile in a given computing environment.

Scenario 4 shows a use case where the interpretation of a license is changed as time progresses. External changes in computing environments often require a change in the interpretation of a policy. For example, in the situation of a security breach, it may be necessary to interpret a policy more strictly or the technological changes in computing devices may require a policy to be interpreted in a different manner. In addition to these, many other different useful scenarios can be enabled by dynamic interpretation.

Dynamic interpretation is a powerful design feature. The fact that interpretation of a policy can be dynamically changed without affecting other parts of a policy is one advantage of the selected framework of the present invention.

The design of the selected framework is based on the principle of design for choice. Most decisions taken in the design of this selected framework are to enable choice for a number of areas which are locked in current usage management systems. Choice creates the necessity to manage interoperability. The design of the framework is motivated by the notion that interoperability is a feature that is supported within the framework. Such a support for interoperability allows for uninterrupted flow of information across different information ecosystems.

An embodiment of the present invention uses standardization in context. A context object is the formal representation of the computing environment. Different information ecosystems and computing environments such as home networks, mobiles devices, sensor networks, etc., have different structures. The internal structure of a context object is independent of the functioning of the framework. Hence, the structure of the context object provides a design space to capture different types of computing environments. In order for context objects to interact with license objects, it is necessary to standardize the interface of context objects.

An embodiment of the present invention also contemplates standardization of licenses. The internal structure a license that captures the logic of the policy is free of standards. This allows licenses to use different types of logics and policy languages without affecting their usability within the framework. Policies defined using different policy languages can be transformed into license objects that can be used across different computing environments. The interface provides license objects usable by UMMs. It is preferable to standardize a license interface in order to achieve interoperability.

In conventional usage management systems, the structure of a computing environment is tightly coupled with the semantics of policy languages. Such a tight coupling makes the policy language dependent on the structure of the computing environment. The separation of these two components is desirable if different types of licenses are to be used across different computing environments. According to an embodiment of the present invention, the context object provides a formal representation for the computing environment and the license object captures the behavior of the policy. Interoperability between the context object and license object can be expressed purely in terms of the compatibility between the license object and the context object.

The context object provides an interface to the license object to query its internal structure and state. If an interface is agreed upon, then the license object is able to query the context object and make usage decisions. Accordingly, it is preferable that both the license object and context object be generated from the same ecosystem ontology. If this generation occurs, then a license is context compatible. License objects are used by UMMs, and UMMs should be able to communicate to a license by use of the interface that is provided. If a license provides in its interface all the functions that are used by a given UMM, then the license is interface compatible.

It is possible to express interoperability of a license with a computing environment in terms of context compatibility and interface compatibility. Furthermore, it is possible to formalize and determine these compatibilities in an automated manner. An embodiment of the present invention demonstrates formal semantics for interoperability for a specific context and license model. Such a capability is necessary in order to enable unhindered flow of content across multiple information ecosystems.

A formal automated mechanism for reasoning about interoperability makes it possible to use different languages and models (with modifications) such as XrML, ODRL, UCON, Bell La Padula, Creative Commons, etc. within the framework. An embodiment of the present invention provides one formal structure for license and context, and how they can be used within the framework to analyze interoperability.

A model to structure license and context objects is provided. Following this, interpretation and operational semantics for the model in accordance to the framework explained earlier is provided. The overview of the model along with the design choices are explained below.

The context consists of three entities, namely, subject, resource and environment, where each entity has a set of attributes. The license consists of a set of activities, where each activity is wrapped in access rules expressed in terms of the attributes of subject, resource and environment. Access rules specify the circumstances—determined by the values taken by subject, resource, and environment attributes—under which a particular activity can be performed. An activity wrapped in access rules is called a restricted activity. A usage policy specifying usage rules, referred to as license expression in the model description, is then expressed over a set of restricted activities. A usage policy specifies semantics such as permissions, obligations, partial ordering, interleaving semantics, count limits, and other usage rules. Usage policy validation is preferably only dependent on the policy state, and is therefore independent of the context object. An activity is permitted, given that it satisfies both the usage policy and the access policy. In the model, a simple first order language for access policy specification is defined, and a usage policy language capable of expressing only permissions is generated. Both of these selections are made to demonstrate the capabilities that such a license structure offers.

The present embodiment of a model provides two advantages, namely, separation of access and usage rules, and formal semantics for interoperability. In the license structure, a design space is created for access and usage rules. In conventional policy languages these two aspects of usage control specification are incorporated within a single policy language. However, it is difficult to create a universal policy language that is able to express all types of usage semantics, and also incorporate access rules. The separation of these two aspects of a license allows an independent choice of usage policy and access policy to be used within a license. Sophisticated access control policies can be used in the design space created for generation of restricted activities. Mathematical logics such as deontic logic, linear temporal logic, dynamic logic, etc., that can express the usage semantics mentioned earlier. Policy languages may be used to express usage semantics using these logics. It is therefore possible to develop usage policy languages or use existing ones with modifications in this design space independent of the access policy language used in the license. The ability to leverage the use of existing languages for usage rules expression and access rules expression independent of one another is an advantage of the present model. Another advantage of the present model is the ability to formally reason about interoperability.

The primary entities in the usage management model, namely, context, license and usage management mechanism are now described. A context defines the reference within which usage management is carried out. A context models the computing/system environment within which usage management is carried out, agents or subjects operating in the system, and resources within the system. A license may consist of usage rules that determine in what manner the resources in the system must be used by the agents. A usage management mechanism may interpret and enforce a license within a given context. Each of the entities are further described in detail below.

A context is defined by the tuple C=⟨E,S,R⟩, where E represents the set of system environment properties, S represents the set of subject properties and R represents the set of resource properties. Each property is a place holder for a set of values. The values taken by a property p range over the elements in its unique respective domain $D_p$.

A context instance, iC, satisfies a context constraint $CR_c$, denoted by iC $cr_c$, if and only if iE $cr_E \land$ iS $cr_S \land$ iR $cr_R$, where, iE $cr_E$ if $cr_E$ evaluates to true under the values taken by iE iS $cr_S$ if $cr_S$ evaluates to true under the values taken by iS iR $cr_R$ if $cr_R$ evaluates to true under the values taken by iR The context, context instance, and context constraint defined above provide the basis for the structure of license and usage management mechanism.

A sample of a context structure, for context C, in shown in Table 1, which shows the properties of the set of Environment (E), Subject (S) and Resource (R), and their respective domains.

TABLE 1

Example Structure of Context
Context

| Entity | Property (p) | Domain ($D_p$) | Functions ($F_{D_p}$) |
|---|---|---|---|
| Environment (E) | Date | {01/01/0000, . . . , 12/31/9999} | {on, before, after, between} |
|  | Location | {Set of all countries} | {equals} |
|  | IPAddress | {0.0.0.0, . . . , 255.255.255.255} | {equals, between} |
| Subject (S) | SubjectID | {000-00-0000, . . . , 999-99-9999} | {equals} |
|  | SecurityClearance | {A, B, C, D, E, F} | {equals, lesser, greater, between} |
| Resource (R) | ResourceID | {000-000, . . . , 999-999} | {equals} |
|  | SensitivityLevel | {1, 2, 3, 4, 5, 6, 7} | {equals, lesser, greater, between} |

The sets E, S and R represent the type of environment, subject, and resource, respectively, uniquely defined by the set of properties contained in each set. An instance of an environment type E, denoted by iE, is defined by the tuple ⟨$p_1=k_1, \ldots, p_n=k_n$⟩, where E={$p_1, \ldots, p_n$} and $k_i \epsilon D_{p_i}$. Subject and resource instances, denoted by iS and iR are defined similarly. A context instance is defined by the tuple iC=⟨iE,iS,iR⟩, with the corresponding context type C=⟨E,S,R⟩

Every domain $D_p$ has a non-empty set of boolean functions or predicates defined over the domain represented by the set $F_{D_p}$. The boolean functions allow to compare the values of properties of the entities defined.

A constraint provides restrictions on the context within with usage is carried out. An environment constraint provides restrictions on the properties of the computing environment. A subject constraint provides restrictions on the properties of the subject performing the usage. A resource constraint provides restrictions on the properties of the resource which is being used.

A constraint is defined as a set of restrictions over a given context. Constraints for a given property are expressed in terms of boolean functions defined for the domain of the property. A constraint for a given context C=⟨E,S,R⟩ is defined by the set $cr_c=\{cr_E, cr_S, cr_R\}$, where $cr_E$, $cr_S$ and $cr_R$ are the constraint for environment E, constraint for subject S, and constraint for resource R respectively. Constraints $cr_E$, $cr_S$ and $cr_R$ are defined as follows:

$cr_E = T|f| \neg cr_E|cr_E \land cr_E|cr_E \lor cr_E$, where, $f \epsilon F_{D_p}, p \epsilon E$, $cr_S = T|f| \neg cr_S|cr_S \land cr_S|cr_S \lor cr_S$, where, $f \epsilon F_{D_p}, p \epsilon S$, and $cr_R = T|f| \neg cr_R|cr_R \land cr_R|cr_R \lor cr_R$, where, $f \epsilon F_{D_p}, p \epsilon R$.

As shown in the table, every domain has a set of boolean functions. Table 2 below shows the instance of the context, denoted by iC, where each of the properties are assigned values from its respective domain.

TABLE 2

Example Structure of Context Instance

| Entity | Property (p) |
|---|---|
| Context instance 1 ($i_1C$) | |
| Environment instance (iE) | iDate = 04/05/2010 |
|  | iLocation = France |
|  | iIPAddress = 127.0.0.1 |
| Subject instance (iS) | iSubjectID = 876-76-7896 |
|  | iSecurityClearance = B |
| Resource instance (iR) | iResoruceID = 789-455 |
|  | iSensitivityLevel = 3 |
| Context instance 2 ($i_2C$) | |
| Environment instance (iE) | iDate = 01/21/2010 |
|  | iLocation = USA |
|  | iIPAddress = 127.0.0.1 |
| Subject instance (iS) | iSubjectID = 876-76-7896 |
|  | iSecurityClearance = F |
| Resource instance (iR) | iResoruceID = 789-455 |
|  | iSensitivityLevel = 3 |

The domain functions are shown in the last column of Table 1. Each function can be used by the policy to express restrictions over the values of a given property. To uniquely identify functions, it is desirable to represent functions in the form of Entity.Property.Function( ). The function E.Date-.between (01/01/2010,31/01/2010, iDate), determines if the value of iDate in the context IC lies between the dates Jan. 1, 2010 and 31/01/2010. Some of the functions from Table 1, and their intended meaning are described in Table 3.

TABLE 3

Example Description of Functions

| Boolean Function | Description |
| --- | --- |
| E.Date.between(d1, d2, iDate) | True if iDate lies between dates d1 and d2. |
| E.Location.equals(loc, iLocation) | True if iLocation equals the location loc. |
| E.IPAddress.between(ip1, ip2, iIPAddress) | True if iIPAddress lies between ip1 and ip2. |
| S.SubjectID.equals(id,iSubjectID) | True if iSubjectID equals id. |
| S.SecurityClearance.greater(sc,iSecurityClearance) | True if iSecurityClearance is greater than the value of sc. |
| R.ResourceID.equals(id,iResourceID) | True if iResourceID equals the value of id. |
| R.SensitivityLevel.between(s/1, s/2, iSensitivityLevel) | True if iSensitivityLevel lies between sc1 and sc2. |

Boolean functions are used to express constraints over a given context. For example constraints for the usage of a given resource in terms of the context described in Table 1 can be expressed as follows:

"The usage must be carried out between Jan. 1, 2010 and Jan. 31, 2010, only in USA and Canada. The usage can be carried out only on a resource with sensitivity level between 2 and 5. The usage must be carried out only by subjects with security clearance greater than level A."

A context constraint for the above mentioned policy is expressed as follows:

$$cr_C = \langle cr_E, cr_{Ss}, cr_R \rangle, \text{ where,} \quad \text{Equation (1)}$$

$cr_E$=E.Datebetween(01/01/2010,31/01/2010,iDate) ∧
(E.Location.equals(USA,iLocation)
∨ E.Location.equals(Canada,iLocation)),
$cr_S$=S.SecurityClearance.greater(A,iSecurityClearance), and
$cr_R$=R.SensitivityLevel.between(2,5,iSensitivityLevel).

From the examples shown in Table 2, it can be seen that $i_1C \not\models cr_C$, because the date and location constraints are not satisfied. However, it can be seen that $i_2C \models cr_C$.

A license, denoted by lic, is defined by the 3-tuple lic= $\langle Racv, \epsilon, I \rangle$, where Racv defines the set of restricted activities in the license, $\epsilon$ defines the license expression over Racv, and the interface I defines the set of functions supported by the license.

An activity is a license abstraction for different operations that may be carried out in a system. For example, verbs such as use, play, pay and operate represent specific set of operations that are performed by agents in a given system. Such verbs when used in a license are called activities, denoted by av. A restricted activity defines the state of the context under which a particular activity must be carried out.

A restricted activity is an activity along with context constraint. A restricted activity, rv, is defined by the tuple rv= $\langle av, cr_C \rangle$, where av is an activity, and $cr_C$ is a context constraint.

An activity instance is an activity av that is being performed with respect to a context instance iC, is denoted by iav=$\langle av, iC \rangle$. An activity instance iav=$\langle av_1, iC \rangle$ conforms to a restricted de activity rv=$\langle av_2, cr_C \rangle$ denoted by iav∝rv if and only if $av_1 = av_2$ and $iC \models cr_C$.

The structure of restricted activities contains context vocabulary, since the constraints are defined in terms of the properties of the context. There needs to be an agreement between the license creator and the usage management mechanism over the type of context that is used to create a license. Instead of fixing the type of context for all computing environment it is proposed that contexts need to be organized in a hierarchical structure. This approach is further discussed below.

The conformance of a restricted activity can only be determined with respect to an activity instance which contains complete information about state of the context when the activity is being performed. This information must be provided to a license by the usage management mechanism.

Consider a restricted activity rv=$\langle view, cr_C \rangle$, where view is the activity and $cr_C$ is the constraint defined over context C by equation (1). The context C is described in Table 1. It is desired to define three activity instances, namely, $iav_1 = \langle view, i_1C \rangle$ $iav_2 = \langle view, i_2C \rangle$ and $iav_3 = \langle print, i_2C \rangle$, where $i_1C$ and $i_2C$ are described in Table 2. The following relationships hold: $iav_1 \not\propto rv$, since $i_1C \not\models cr_C$, $iav_2 \propto rv$, since $i_2C \models cr_C$ and view=view, and $iav_3 \not\propto rv$, because even though $i_2C \models cr_C$, the activity defined in $iav_3$ is print, and that defined in rv is view.

A license expression provides usage semantics such as permission, obligation, rights, etc. to restricted activities defined in a license. The syntax and the semantics of license expression depends on the type of usage control language used by a license.

In the present embodiment, it is desirable to limit the embodiment to a simple usage control language that is capable of defining only the permissions. The semantics of the permissions are defined by the following function: P: Racv→{true, false}, such that if P(rv)=true then rv is a permission, else rv is not a permission.

The license expression of the present embodiment consists of only the non-context vocabulary, since it is defined only in terms of restricted activities. Its syntax, and semantics are completely independent of the context and therefore usage semantics can be interpreted by the license itself. In addition to that, since usage semantics are not dependent on the type of computing environment, this aspect of the license is free of standards, and open to innovation and change.

Considering a license lic=$\langle Racv, \epsilon, I \rangle$. Let Racv=$rv_1$, $rv_2$ and $rv_3$, where $rv_1$=$\langle view, cr_C \rangle$, $rv_2$=$\langle transfer, cr_C \rangle$ and $rv_3$=$\langle modify, cr_C \rangle$, and $cr_C$ is the constraint defined over context C by equation (1). It is desirable to define the license expression that only view and modify are the only permissions. The license expression $\epsilon$ can be denoted by the function: P: $\{rv_1, rv_2, rv_3\} \rightarrow \{true, false\}$, such that $P(rv_1)$=true, $P(rv_2)$=false and $P(rv_3)$=true.

In this embodiment every license supports a license interface, I, that defines the set of functions that are supported by a given license. These set of functions are used by the usage management mechanism to query a license regarding different enforcement tasks. There needs to be an agreement between the license and the usage management mechanism over the nature of this interface. The nature and form of this interface depends on the type of license and its capabilities. However, this interface needs to be standardized in order for a license to be functional in different computing environments. Rather than fixing on a particular type of interface for all licenses, it is desirable to use the hierarchical approach, that allows design of complex, intelligent licenses. This approach is explained in detail below.

Continuing with the example of the license lic=⟨Racv, ϵ, I⟩. Let Racv={$rv_1, rv_2, rv_3$} as described earlier, and let ϵ be defined by the function P:{$rv_1, rv_2, rv_3$}→{true, false}. It is desirable to define the interface of the license as consisting of two functions, I={allowed (iav), permissions( )}.

The function allowed (iav) returns a boolean value indicating whether a given activity instance is allowed or not. The algorithm for the function allowed (iav) for the license lic=⟨Racv, ϵ, I⟩ is described as:

```
allowed (iav =⟨acv₁,iC⟩)
1   for all rv =⟨acv,cr_C⟩ ∈ Racv do
2       if (acv == acv₁) ∧ (P(rv) == true) ∧ (iav ∝ cr_C) then
3           return true
4       else
5           return false
```

Line 1 of the above algorithm iterates through all the restricted activities to determine if any restricted activity satisfies the conditions in line 2 of the algorithm. The first condition in line 2 of the algorithm checks whether the activities in rv and iav are the same. The second condition checks whether or not the restricted activity current examined is a permission. Condition 3 checks whether the context constraints $cr_C$ defined in the restricted activity are satisfied by the context instance iC (the context state under which the activity is being carried out). If all the three conditions are satisfied, then the activity is allowed or else it is not allowed.

The function permissions( ) simply iterates through all the restricted activities in Racv and returns the set of those restricted activities which are permissions.

It should be noted that almost all licenses support the function allowed(iav), because it is fundamental to the enforcement of the license. However, the implementation of this function depends on the semantics of the license expression ϵ. More sophisticated licenses have complex usage semantics, and accordingly the function allowed( ) is implemented differently. Moreover, such licenses include a much richer set of functions in their respective license interface.

A usage management mechanism is an entity that operates within a computing environment, and is responsible for enforcing licenses. A usage management mechanism, denoted by em is defined by the 3-tuple umm=⟨UI, Act, iC⟩. The set of functions that the usage management mechanism uses to interact with licenses is defined by UI. A license interface must support all the functions defined in the set UI. Act is the set of identifiable actions enabled in the computing environment. The actions defined in the set Act are the actions that are performed by the users, and can be uniquely identified within the computing environment. These actions are the application-level or operating system-level commands that can be identified within the computing environment. For example such actions can be openfile, writefile, copyfile, etc. The activities defined in the license are mapped to these actions. This mapping is described below. The context instance maintained by the usage management mechanism is iC. Whenever an action is requested within the computing environment, the usage management mechanism updates the context instance iC to record the state of the context under which the action is to be carried out.

The usage management mechanism on the computing platform is used by the higher level applications and the security mechanisms. If the computing platform undergoes changes in technology, the sets UI, Act and iC are changed accordingly.

The activities or the verbs used in license expression are abstract terms, such as use, copy, transfer, play, etc. It is possible to agree upon and fix the activities that is used to express licenses for a particular type of user management ecosystem. On the other hand, the computing environments deal with actions that are identifiable and closely relate to the ones supported by operating systems. A usage management mechanism is agnostic to the activities defined in a license, and a license is agnostic to the actions defined in the usage management mechanism. An interpretation function is a map that maps the activities in a license to the actions defined in the usage management mechanism. For the simplicity of the discussion it is assumed that the map is one-to-one.

Formally, an interpretation function Int: Acv→Act, where Act is the set of activities, and Act is the set of actions. For example:

Acv={view,transfer,modify}, and
Act={openfile,writefile,sendfile}, then
Int(view)=openfile,Int(transfer)=sendfile, and
Int(modify)=writefile.

Figure 6:
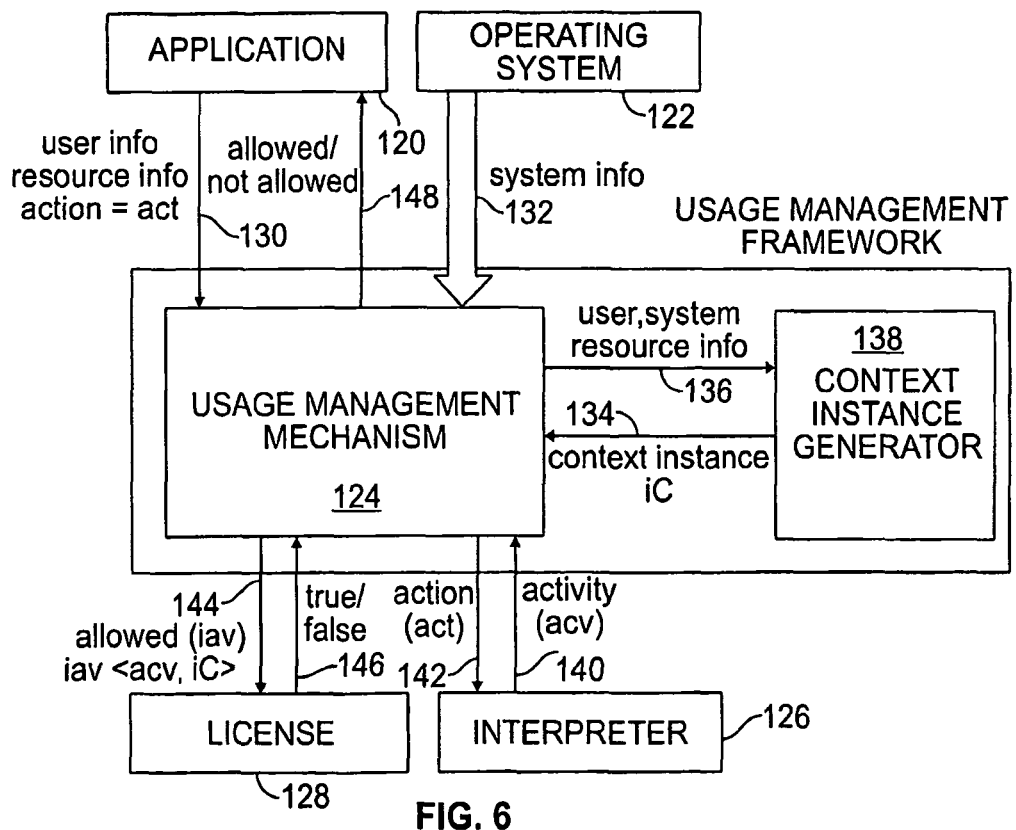
FIG. 6 illustrates a block diagram of operational semantics of the calculus according to an embodiment of the present invention.

The operational semantics of the calculus of an embodiment is shown in FIG. 6. All the entities, namely, application 120, operating system 122, usage management mechanism 124, interpreter 126 and license 128, are active entities (or executable objects with standard interfaces) that operate and execute within the computing environment.

The process of license enforcement is shown in FIG. 6. At arrow 130, the application 120 requests the usage management mechanism 124 whether a particular action ("act") on a given resource by a given user is valid or invalid. As a part of the request, the application 120 provides all the information about the user, the resource and the action that is to be performed. At arrow 132 the usage management mechanism 124 obtains the current state of the computing environment from the operating system 122. The type of information obtained by the usage management mechanism 124 depends on the manner in which the context is modeled. Such information may include, current location, day, date, time, ip address, etc. At arrows 134 and 136, the usage management mechanism 124 uses the context instance generator 138 to generate the context instance iC by using the current values of system parameters, user information and resource information. At arrows 140 and 142, where the usage management mechanism 124 queries the interpreter to determine the activity ("acv") that corresponds to the action ("act") information provided by the application. Once the activity corresponding to the action is obtained, the usage management mechanism 124 generates the activity instance iav=⟨acv,iC⟩. At arrows 144 and 146 the usage management mechanism 124 invokes the allowediav function provided by the license, the license executes the allowed(iav) function as described earlier, and returns the true/false value back to the usage management mechanism 124. Finally, at arrow 148 the usage management mechanism 124 conveys back to the application 120 the validity of the action.

In the following description a formal calculus for reasoning over interoperability is provided. The model described herein is designed to be used in open distributed environments. Most of the conventional approaches to access control, usage control and digital rights languages have focussed on creating a more expressive language by using either a more sophisticated formalism or a mathematical logic with powerful reasoning capabilities. The model described herein uses simple first order logic, and does not define any particular policy specification language. Rather, the model provides a scaffolding upon which different types of usage management policy languages can be developed, and still be used in an open environment.

One advantage of the model of the present invention lies in the design, where identified focal points in the architecture where standards must be defined are provided, and identification of the areas are purposefully kept free of standard to enable innovation and flexibility. The model makes a clear distinction between policy specification and policy interpretation. Such a separation allows dynamic interpretation of policies relative to the computing environment.

The model of the present invention may allow formal reasoning of interoperability of licenses with computing environments. In the discussion below the formal semantics for determining interoperability in the proposed structure for licenses and contexts is provided. The design of the model may allow formalization of the notion of interoperability of licenses with computing environments. If automated functioning of systems is desired, the ability to reason about interoperability is essential. The definition of interoperability of a license with an usage management mechanism is explained below.

The notion of interoperability is divided into two types of compatibilities, namely, context compatibility and interface compatibility. Context compatibility means that the context properties used by the license exist in the context instance provided by the usage management mechanism. Interface compatibility means that the usage interface functions used by the usage management mechanism exist in the interface provided by the license.

Defining these concepts, let the properties used in a given constraint cr be denoted by p(cr). Then a given restricted activity $rv=\langle av,\{cr_e,cr_s,cr_r\}\rangle$ is compatible with a given context $C=\langle E,S,R\rangle$, denoted by $rv \bowtie^c$, if the following conditions are satisfied: (i)$p(cr_e) \subseteq E$(ii)$p(cr_s) \subseteq S$(iii)$(cr_r) \subseteq R$. Given a license $lic=\langle Racv,\epsilon,I\rangle$, and an usage management mechanism $umm=\langle UI,Act,iC\rangle$, where C is the context of the instance iC, license lic is context compatible with the usage management mechanism em, denoted by $lic \bowtie^c umm$, if $\forall rv \in Racv, rv \bowtie^c C$.

The second type of compatibility is between licenses and usage management mechanisms. Usage management mechanisms interact with license objects, and use the functions provided by the license objects to query the license regarding usage management decisions.

Informally, interface compatibility is defined as follows: If a license can answer all the queries asked by a usage management mechanism, then the license is interface compatible with the usage management mechanism. Formally, the interface compatibility is defined as follows: Given a license $lic=\langle Racv,\epsilon,I\rangle$, and a usage management mechanism $umm=\langle UI,Act,iC\rangle$, the license lic is interface compatible with usage management mechanism umm, denoted by $lic \bowtie^t umm$ if $UI \subseteq I$.

Interoperability is defined in terms of context compatibility and interface compatibility. A license is interoperable with a usage management mechanism if it is interface compatible with the usage management mechanism and context compatible with the content used by the usage management mechanism. Formally, a lic is interoperable with a usage management mechanism umm, denoted by $lic \bowtie umm$ if $lic \bowtie^c umm$ and $lic \bowtie^t umm$.

Figure 7:
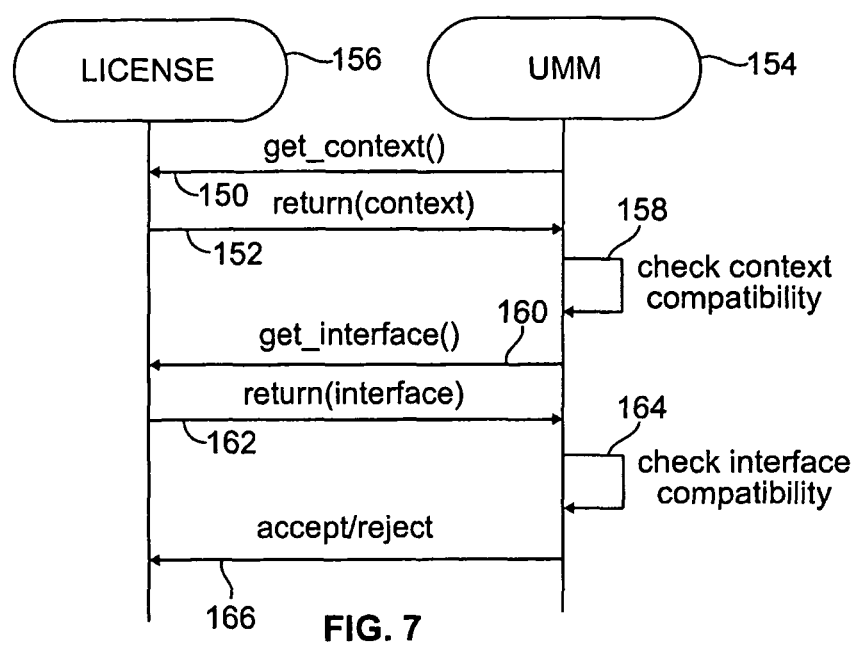
FIG. 7 illustrates a diagram of interoperability protocol between a license and usage management mechanism according to an embodiment of the present invention.

Since the model of the present invention supports formal definitions for license interoperability, it is possible to mange automated distribution of licenses across different computing environments. In order to achieve this a standard interoperability protocol must exist between licenses and usage management mechanisms as shown in FIG. 7.

In messages 150 and 152, respectively, a usage management mechanism 154 obtains the context that is used by a license 156 to express the policy. In message 158, the usage management mechanism 154 checks context compatibility. In messages 160 and 162, the usage management mechanism 154 obtains the set of license interface functions, and checks interface compatibility in message 164. If both context and interface compatibility checks pass, then usage management mechanism 154 sends an accept message 166. Otherwise, the usage management mechanism 154 sends a reject message via the arrow 166 to the license 156.

Automated reasoning of interoperability is another distinguishing feature of the model. Interoperability is a feature that is supported by the calculus from within.

Standardizing the structure of context and license interface set are the essential requirements to enable interoperability. However, fixing these two entities severely limits the flexibility of the model. No single context can cover all different types of computing environments, user types and resource types. One solution is to arrange both these entities in hierarchies so that newer extensions can be defined. The most abstract entities at the top of the hierarchy includes features that are common to all entities. For example the most top level contexts include properties such as location, time, etc., that are common to all contexts.

It is possible to reason about interoperability by the hierarchical relationship of contexts and interfaces. Formally, it is desirable to define context and license interface inheritance as follows:

Inheritance is denoted by symbol $\trianglerighteq$, and $E' \trianglerighteq E$ means type E' inherits type E. The inheritance of contexts, environments, subjects and resources are formally defined as follows:

Consider context $C=\langle E,S,R\rangle$ and context $C'=\langle E',S',R'\rangle$, then the following hold: environment type E' inherits environment type E, denoted by $E' \trianglerighteq E$, if $E \subseteq E'$, subject type S' inherits subject type S, denoted by $S' \trianglerighteq S$, if $S \subseteq S'$, and resource type R' inherits resource type R, denoted by $R' \trianglerighteq R$, if $R \subseteq R'$.

A context C' inherits context C, denoted by $C' \trianglerighteq C$, if the following conditions are satisfied: $E' \trianglerighteq E$, $S' \trianglerighteq S$, $R' \trianglerighteq R$.

Given these definitions, it is now possible to reason about the interoperability of a license with respect to two contexts that are related by the inheritance relationship. If a license is context compatible with an usage management mechanism umm, then it is also context compatible with any usage management mechanism umm' that uses a context that inherits the context used by umm.

Let $umm=\langle A,iC,U\rangle$ and $umm'=\langle A',iC',U'\rangle$, be two usage management mechanisms, such that $C' \trianglerighteq C$. Then the following holds: $lic \bowtie^c umm \Rightarrow lic \bowtie^c umm'$.

Consider license $lic=\langle Rv,\epsilon,I\rangle$ and license $lic'=\langle Rv',\epsilon',I'\rangle$. Then, lic' inherits lic, denoted by $lic' \trianglerighteq lic$ if $I \subseteq I'$.

The inheritance relationship between the licenses can be used to reason about the interface compatibility of licenses with usage management mechanisms. It can be concluded that the following result holds:

For licenses lic,lic' and usage management mechanism umm, given $lic' \trianglerighteq lic$, then $lic \bowtie_i umm \Rightarrow lic' \bowtie^t umm$. This means that if a license of type A' inherits type A, then the license of type A' is interface compatible with all the usage management mechanisms with license of type A is compatible. Compatibility of licenses with usage management mechanism can be therefore determined, if their respective hierarchical relationships are known.

The need for usage management solutions that operate in open distributed environments is disclosed. The present invention applies principles of system design to develop a calculus for usage policy specification, interpretation and enforcement. In this model, the present invention identifies the focal points where it is necessary to apply standards, and areas that should be free of standards. One underlying principle of the model of the present invention is the separation of policy expression, policy interpretation and policy enforcement. Such a separation allows policies to be expressed with minimal prior knowledge of computing environments in which the policies is interpreted. The model enables many distinguishing features such as dynamic interpretation and formalizing the notion of license interoperability. These features are useful for expression, interpretation and enforcement of licenses in open distributed environments.

This model may be utilized to enable added functionalities such as mashups, that allows merging of policies. It is possible to develop a library of license languages using different types of logics with varying capabilities that can be used within the model. It is possible to build upon the model to develop different types of ecosystems that can handle different types of content, resources and data including medical data, commercial content, and financial data as is known to those skilled in the art.

The implementation an embodiment of the present invention using a cloud-based solution is disclosed. Architectures are partitioned according to the design choices that result from considering how a resource and its associated license can be managed. The implementation of a cloud-based service, based upon one of the proposed architectures, is now described.

If the issues and problem described with respect to mashups in the background section are to be addressed by any architecture, it becomes important to consider the source as consisting of two things, the resource or service that is being requested, along with the license associated with using it. A number of different architectures emerge by considering the different choices that can be made with respect to the location of the resource and its license.

It is helpful to separate rights-related architectural issues and usage-related architectural issues from security-related architectural issues. For instance, the architectural solution for managing rights in mashups should be independent of, but must work with, the browser security model. If these become intertwined, and therefore tightly coupled, a number of problems emerge. First, adding rights management to the security model introduces complexity that may in fact increase the chance of security compromises. For example, an innocuous looking change to some aspect of the rights management framework may actually introduce a subtle hole in the security framework. It should also be recognized that some elements of rights management, such as those that deal with the enforcement of rights-related actions, may rely upon an underlying security environment. However, there are other situations where rights management has very little to do with security. For example, someone constructing a mashup may only want to know what they are able to do with the mashup stream they are producing, as they are perfectly willing to follow the resulting terms. Furthermore, they would like to be automatically notified whenever they must satisfy some obligation related to the mashup stream, e.g., the payment of a royalty. Thus, the desire is to produce a well-defined interface between the rights management framework and the security framework, so that the rights management framework may use the various security features and protocols it may require through an API. Finally, it should be recognized that there are many different types of security environments. Thus, this loose coupling has the additional desirable effect of allowing the rights management framework to be dropped into many different security environments. Three possible architectures for managing rights in mashup, each differentiated according to how source data and license are treated are discussed below.

In particular, three architectures partitioned according to how a source and its associated license are managed are discussed. A centralized license management approach is disclosed as a cloud service. Moreover, the development of a rights management infrastructure for Web 2.0 technologies allows the opportunity to develop a DRM infrastructure that is beneficial to those using it.

Figure 8:
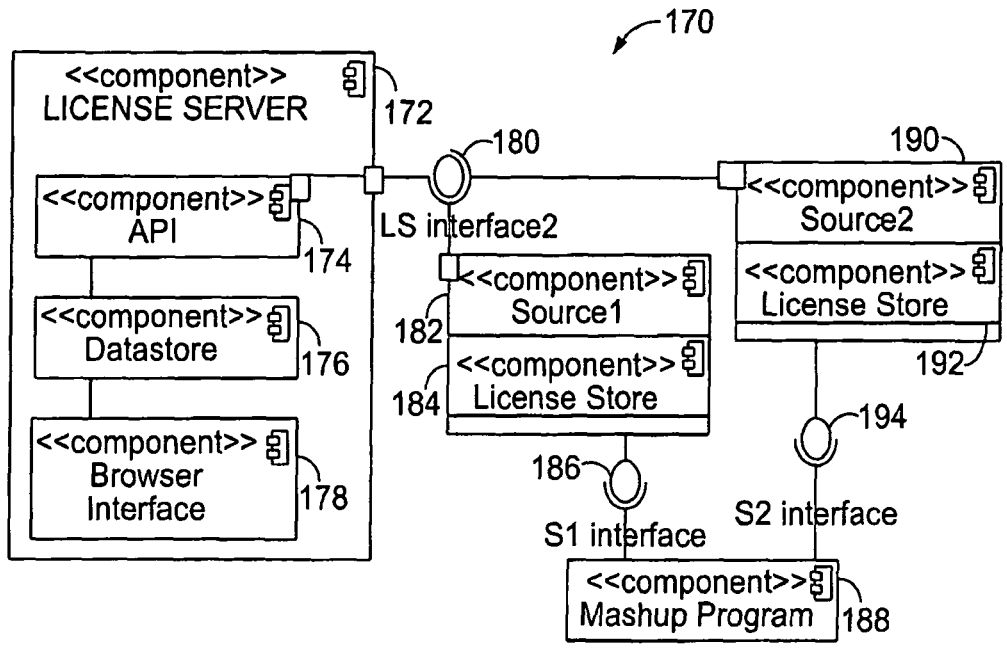
FIG. 8 illustrates architectural components associated with a "smart license" mashup architecture according to one embodiment of the present invention.

In a first architecture the license is tightly bound the resource, and they may be considered as being one entity. The components and likely interfaces associated with such an architecture are shown as a UML component diagram shown generally as 170 in FIG. 8. This architecture can be implemented as a "smart license", where the license itself is an executable piece of code. One of the advantages of this approach is the tight binding of the resource with the license, thereby giving the source complete control over the license structure. In addition, if the usage terms are "traveling" with the resource, the problem of the usage terms becoming disassociated from the resource is essentially removed. A security issue that may arise from this approach is that the license structure is always attached to the mashup program, even if a decision not to grant access to the resource is made. Thus, the license bundle may be vulnerable to being proxied and modified. However, a digital signature may overcome this security problem. Moreover, a browser may require a plug-in in order to support this architecture.

In the first architecture, a License Server 172 has API 174, DataStore 176, and Browser Interface 178 components. A licenser server interface 180 connects to a "Source 1" 182 and License Store 184, which are connected via an S1 Interface 186 to a Mashup program 188. The licenser server interface 180 is also connected to a "Source 2" 190 and License Store 192, which are connected via an S2 interface 194 to the Mashup program 188.

Figure 9:
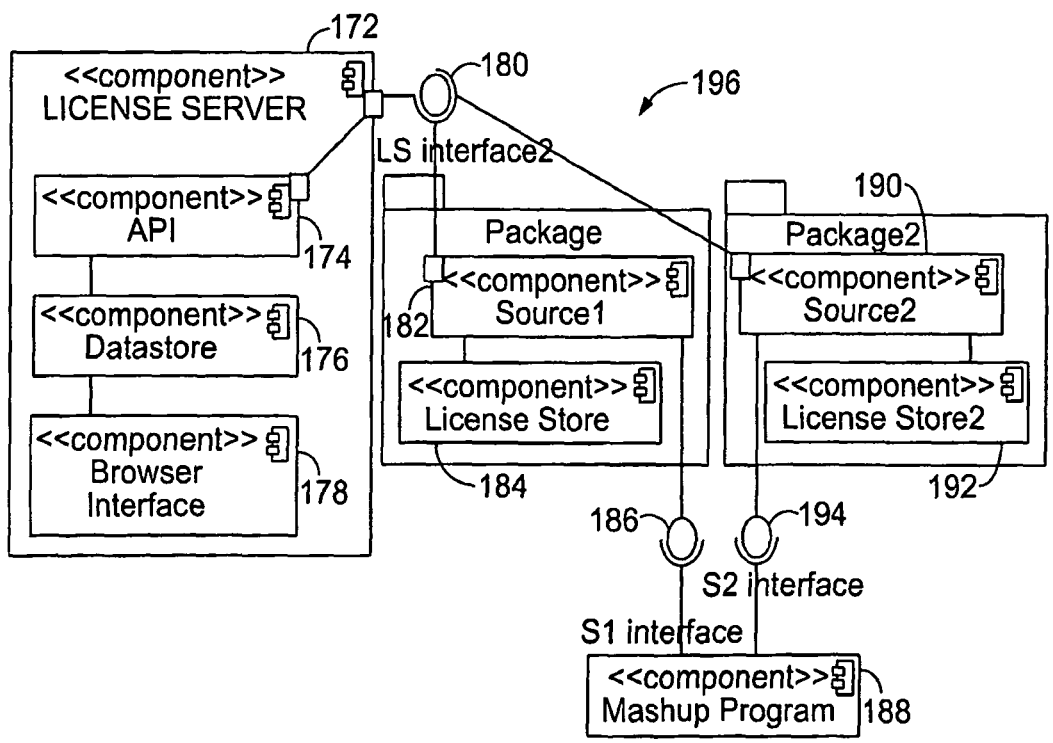
FIG. 9 illustrates architectural components associated with a distributed license mashup framework according to one embodiment of the present invention.

The structure of the second architecture 196 is shown in FIG. 9. FIG. 9 has like components designated with similar reference numbers. In this case, the license and the content are still tightly bound, although there is now a stronger possibility of disassociating the resource from the license. Thus, the source still has complete control over the license structure, and it should be more difficult for a malicious adversary to proxy and edit the license.

Figure 10:
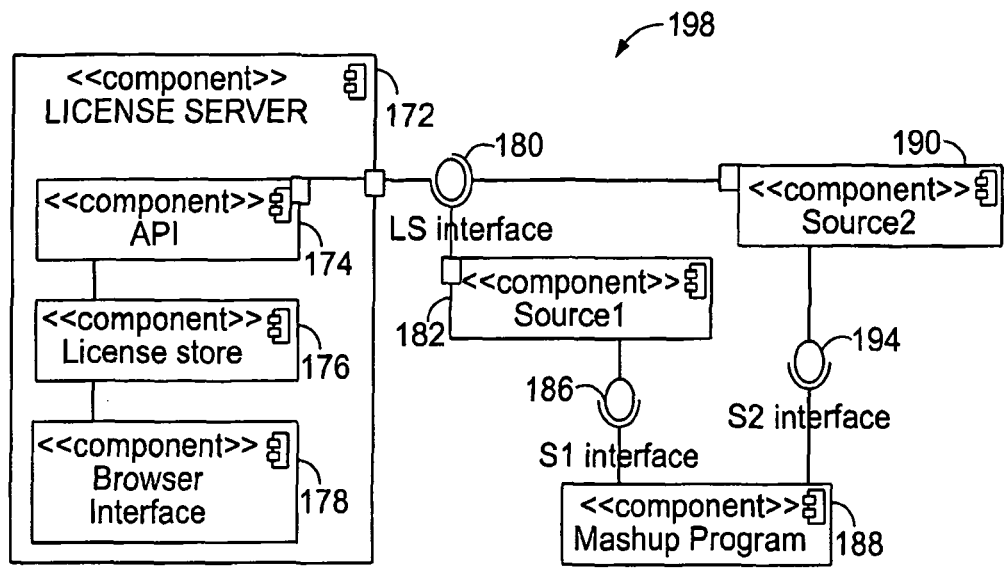
FIG. 10 illustrates architectural components associated with a centralized license mashup framework according to one embodiment of the present invention.

In a centralized license management system for mashups, shown generally as 198 in FIG. 10, a license server is used to manage mashups. The components associated with this approach are shown in FIG. 10 and have similar components identified with like reference numerals. An advantage of this approach is that the license server can easily manage upgrades to the licensing infrastructure, and no special infrastructure is required for license management in any of the other servers. Communication between the license server and the other components can occur through asynchronous JavaScript and XML ("AJAX") calls. Thus, this approach requires no changes to the current Internet infrastructure.

Figure 11:
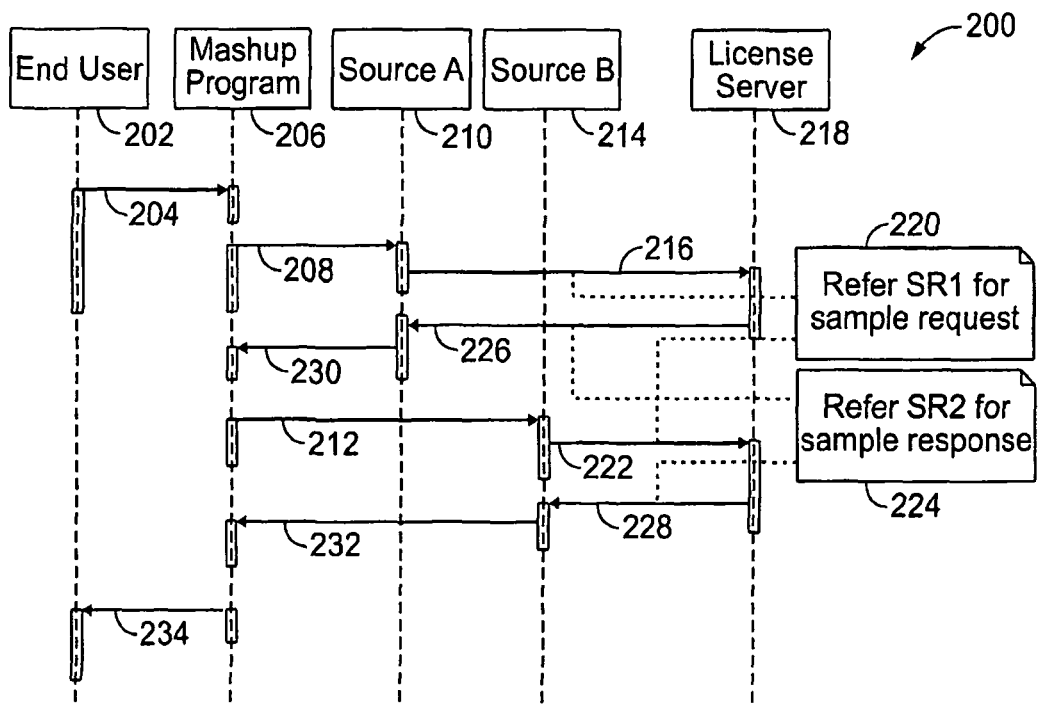
FIG. 11 illustrates a sequence diagram for a cloud-based centralized license management mashup architecture according to one embodiment of the present invention.

The above architecture is easily implemented as a cloud service shown generally as 200 in FIG. 11. The cloud service 200 requires the owners of sources to register with the server. Then, a mashup creator may also register with the service, in order to gain access to the sources. The steps taken to validate all of the actors in this scenario are shown in FIG. 11. In this implementation, license terms are expressed in XML, and the cloud service itself is responsible for reasoning over the combined license in the mashup using a simple logic and ontology.

FIG. 11 shows an End User 202 provides a Mashup Call 204 to a Mashup program 206. The Mashup program 206 generates a data request 208 for Source A 210 and a data request 212 for Source B 214. Source A 210 sends a Validate Mashup program request 216 to License Server 218. A Refer SR1 for sample request 220 also occurs. Similarly, Source B 214 sends a Validate Mashup program request 222 to License Server 218, and a Refer SR2 for sample response 224 occurs. The License Server 218 sends a Validation Response 226 to Source A 210 and another Validation Response 228 to Source B 214. Source A 210 sends data 230 to the Mashup program 206. Source B 214 also sends data 232 to the Mashup program 206. The Mashup program 206 sends a Mashup 234 to the End User 202.

Figure 12:
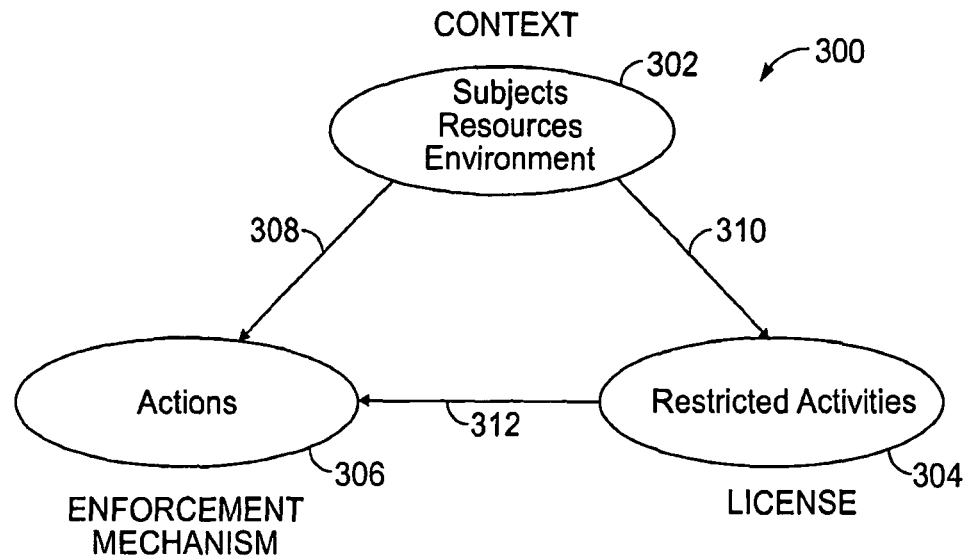
FIG. 12 illustrates a block diagram of a high level interaction between the components of systems for creating generic license language for use in DRM according to the present invention.

In yet another exemplary embodiment shown generally as 300, the context 302 defines the medium with respect to which licenses 304 are expressed, interpreted, and enforced 306 and is shown by FIG. 12. The nature of the context may vary to a great degree, and depends on the type of application. For example, the context can be an office, a university library system, a cell phone, an authorized domain of home devices, and other such media. Arrow 308 maintains an instance of the context 302, and arrow 310 expresses restrictions in terms of a context. The arrow 312 refers to how a license is interpreted and enforced within an enforcement mechanism.

To capture all these different possibilities, context is modeled as an abstract entity with a finite set of properties. For example, a cell phone context may have properties such as location, Internet Protocol ("IP") address, user, time, month, year, memory, processor, and other properties that may be of interest to the application. Values taken by each property range over its respective domain. For example, the property month ranges over the set: {"January", "February", . . . , "December", the property IP address ranger over the domain of all the valid IP addresses, and so on. Every domain defines a finite set of boolean functions that operate over the domain. For example, fall(x), spring(x), and summer(x) are boolean functions over the domain of months, where the value of x ranges over all the months. The function equals(x, y) or x=y is common to all domains, and is used to check the equality of two elements or the value held by a variable.

These boolean functions provide the basic building blocks for constructing constraints in terms of context properties. The rules for constructing these constraints are specified in the constraint language that is used to create restricted activities.

Since licenses deal with actions, it is natural to constrain the actions by placing restrictions on the subject performing the actions, and the resource over which the actions are being performed. For this reason, context 302 is divided into three entities, namely, environment, subject and resource, where each of these entities are represented by a set of properties.

Figure 13:
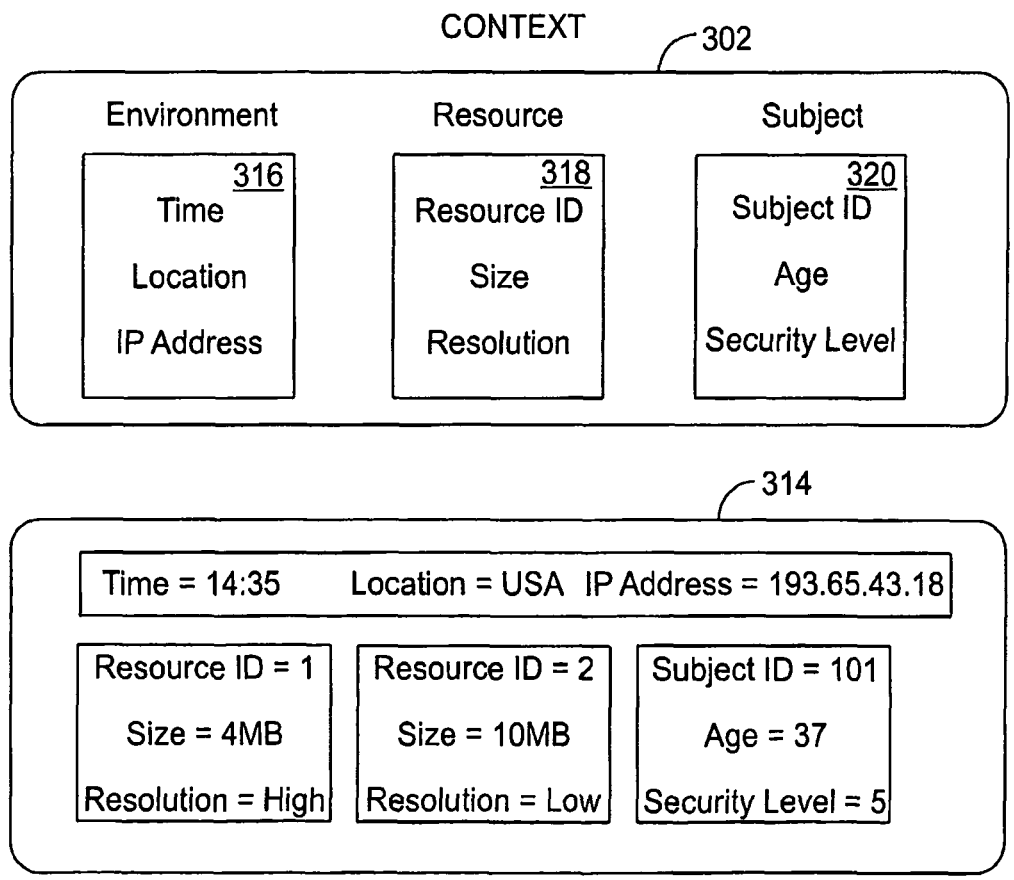
FIG. 13 illustrates a block diagram of structure of a context and context instance according to an embodiment of the present invention.

FIG. 13 illustrates a block diagram of structure of a context 302 and context instance 314 for the embodiment of FIG. 12. A context 302 is again defined by the tuple C= $\langle E,S,R \rangle$, where environment 316, subject 318, and resource 320 each are defined by a set of properties represented by mutually disjoint sets E, S, and R, respectively. The values taken by a property p range over the elements in its unique respective domain $D_p$. Every domain $D_p$ has a non-empty set of boolean functions or predicates defined over the domain represented by the set $F_{Dp}$.

The sets E, S, and R represent the type of environment, subject, and resource, respectively, uniquely defined by the set of properties contained in each set. An instance of an environment type E, denoted by iE, is defined by the tuple $\langle p_1=k_1, p_2=k_2 \ldots, p_n=k_n \rangle$, where E={$p_1, \ldots p_n$} and $k_i \in D_{pi}$. Subject and resource instances, denoted by iS and iR are defined similarly. A context instance is defined by the tuple iC=$\langle iE,iS,iR \rangle$, with the corresponding context type C= $\langle E,S,R \rangle$.

Next, a license is conceptualized and formally defined. In its most general sense, a license is a set of rules that determine a controlled behavior within an environment. Flexibility in expression of control rules and interoperability of licenses across different contexts are the central parameters that drive the design of the license structure.

The challenge of flexibility involves accommodation of various semantics that need be expressed in a license. The challenge of flexibility is addressed by creating appropriate architectural spaces for specification of various license semantics so that different languages using appropriate logic and having sufficient expressive power can be used according to the need of the application.

The challenge of interoperability can be broken down into two sub-challenges, namely, the challenge of constructing licenses interoperable with different environments and the challenge of using a license across different environments. To address the first challenge, the structure of a license is divided into two parts, namely, parts of license that are context specific and parts of license that are context independent. The second challenge is addressed by providing a standard interface by means of which licenses are used by enforcement mechanisms and by separation of license expression and license interpretation.

A common property of all licenses is that they include a set of activities, whose execution is governed by a set of rules. In addition to that, every license provides an interface, or a set of functions, by means of which an enforcement mechanism communicates with the license. The structural division of a license is carried out by differentiating in access control specification and usage control specification. Each activity is first restricted by means of an access control specification defined in terms of the context. An architectural space is created for such specification, where a choice appropriate ACL may be used to specify constraints in terms of the context structure defined earlier. The type of ACL used for specification of constraint rules depends on the requirements of the application. However, any ACL that is used must have the capability to wrap an activity with constraint rules defined in terms of a context, referred to as restricted activities.

A license consists of a set of restricted activities, accompanied by a structure that provides usage semantics. The usage specification is completely independent of the context. For instance, relationships between a permission and its respective obligation are independent of the context in which these semantics are interpreted. Similarly, if an activity can be performed five times only, then these semantics are independent of the context. The structure defined over the restricted activities provides this group of restricted activities with semantics such as permissions, obligations, partial dependencies, parallel executions, and other such semantics mentioned earlier. An architectural space is created for defining these semantics using a choice of appropriate UCL. Such a UCL may make use of simple algebraic set theory to any of the powerful logics such as temporal logic, deontic logic, and dynamic logic capable of expressing complex semantics, according to the need of the application. It should be noted that the syntax and semantics of UCL can be defined completely independent of the context in which the license is interpreted and enforced.

The challenge of usability of licenses across different applications is addressed by means of defining hierarchies of contexts, license interfaces and enforcement mechanism interfaces. Concepts from object oriented design paradigms are used to address these challenges.

A license is a collection of restricted activities, an expression that provides a structure to the collection of restricted activities, and an interface consisting of a set of functions that reflect the capabilities of the license. The interface of the license determines the type of the license with T being the set of all license types, and F being the universal set of all the functions supported by all the license types.

Thus, a license is defined by the 3-tuple $\langle Racv, \epsilon, I \rangle$, where Racv defines the set of restricted activities in the license, $\epsilon$ defines the license expression over Racv—the expression $\epsilon$ belongs to the UCL of the license, and the interface $I \subseteq F$ defines the set of functions supported by the license.

The manner in which constraints are expressed is determined by the type of ACL used. However, any ACL that is used to express constraints, must do so in terms of the context that is explained earlier. For purposes of this application, a simplified ACL to express constraints in terms of context is used.

First, a constraint in terms of which restrictions are defined is introduced. A constraint is a boolean expression defined in terms boolean functions over properties. Mathematically, a constraint is defined as follows: $cr := T | f | f \wedge f | f \vee f \neg f$, where f is a boolean function.

Let $D^E$, $D^S$ and $D^R$ be the set domains of the all environment properties $p \in E$, subject properties $p \in S$, and resource properties $p \in R$, respectively. Let $F_{D^E}$, $F_{D^S}$ and $F_{D^R}$ denote the set of all boolean functions defined over the domains of environment, subject and resource respectively. Mathematically, $$F_{D^E} = \bigcup_{D_p \in D^E} F_{D_p}$$

$$F_{D^S} = \bigcup_{D_p \in D^S} F_{D_p}$$

$$F_{D^R} = \bigcup_{D_p \in D^R} F_{D_p}$$

For convenience, constraints are categorized into three types, namely, environment constraints $cr_e$, subject constraints $cr_s$, and resource constraints $cr_r$. Mathematically, $$cr_e := T | f | f \wedge f | f \vee f | \neg f \text{ where, } f \in F_{D^E}$$

$$cr_s := T | f | f \wedge f | f \vee f | \neg f \text{ where, } f \in F_{D^S}$$

$$cr_r := T | f | f \wedge f | f \vee f | \neg f \text{ where, } f \in F_{D^R}$$

Let Racv denote the set of activities. A restricted activity defines an activity along with a set of constraints on the environment, subject and resource. A restricted activity is defined by the tuple $\langle av, CR \rangle$, where $av \in CR$ and $CR = \{cr_e, cr_s, cr_r\}$. The set CR represents the set of environment, subject and resource constraints.

The ACL mentioned here is just one of the ways to construct a restricted activity. Depending on the requirement of the application, different ACLs may be designed to express constraints in more sophisticated ways.

License languages are the set of UCLs that provide semantics to a set of restricted activities. In this framework an architectural space is created for the implementation of usage control languages. The expressive power of the UCL is determined by the range of various semantics that the language is able to provide.

For simplicity, a simple stateless UCL may be used, $L_u$, whose capabilities are limited to expressing permissions. The model for $L_u$ is defined as follows. Let E denote set of all identifiable activities (ideally restricted activities, but UCL semantics do not deal with restrictions), and let $\Sigma_p \subseteq \Sigma$ denote the set of permitted activities. Let $P(a), a \in \Sigma$ denote that a is a permitted activity. Then, $P(a)$=true if and only if $a \in \Sigma_p$.

In its most simplified form, a UCL can be a set of restricted activities with each element (restricted activity) of the set representing a permission. On the other hand, a UCL can be much more expressive capable of expressing varied concepts such as mandatory parallel executions, partial dependencies, state based semantics, deontic semantics, interleaving semantics, and other such modalities. License languages or UCLs are categorized into two divisions, namely, languages that provide a mechanism to maintain a state by means of context independent variables, and stateless languages that do not maintain any state. Embodiments of the present invention in which the usage control can be specified using different logics are illustrated in FIGS. 14(a)-(f).

Figure 14:
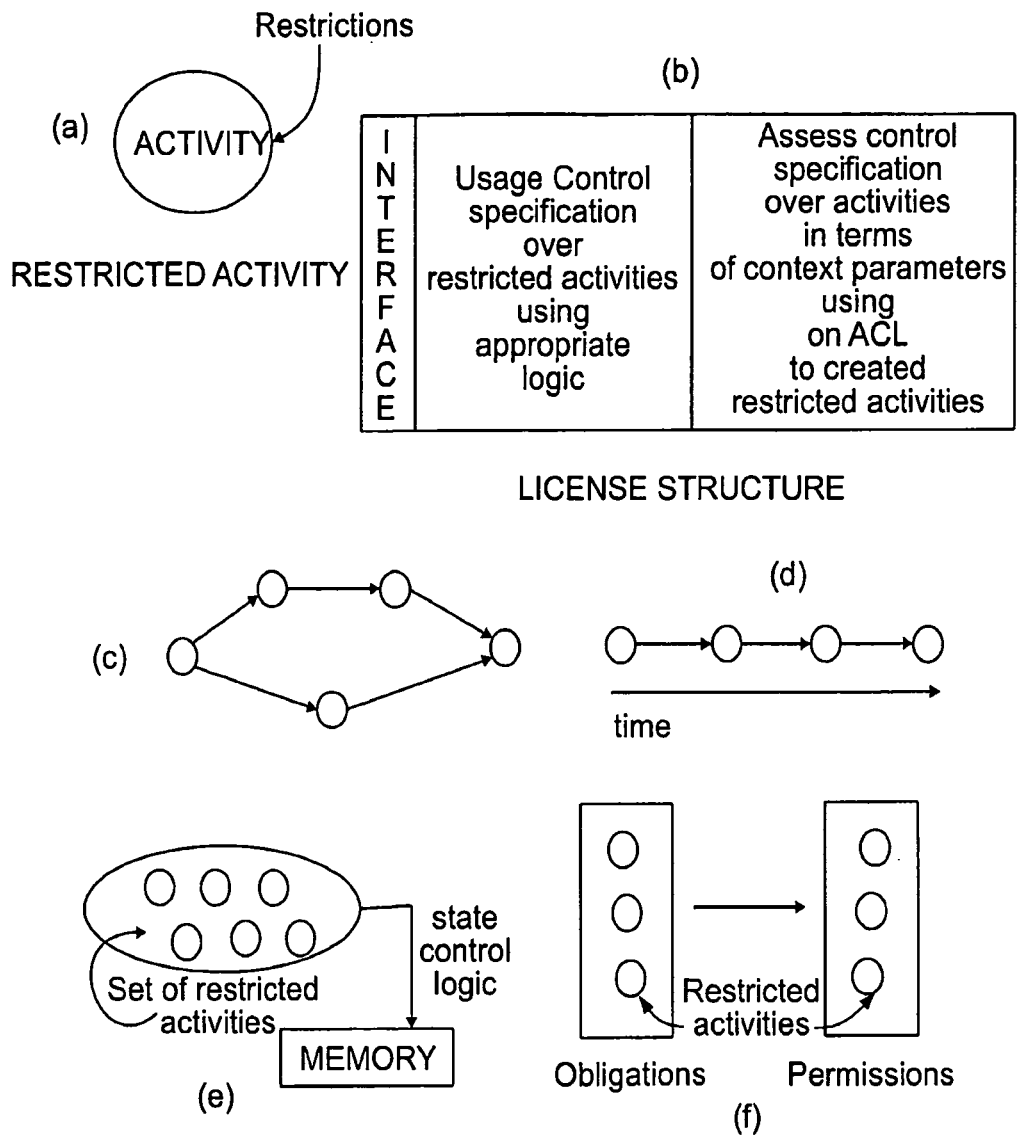
FIG. 14 illustrates a block diagram of various methods in which usage control can be specified using different logics according to an embodiment the present invention.

FIG. 14(a) has access control specification in terms of context using ACL. FIG. 14(b) shows a license structure. FIG. 14(c) shows usage control using partial ordering of restricted activities. FIG. 14(d) shows usage control by temporal ordering using temporal logic. FIG. 14(e) shows usage control of restricted activities using state based logic. FIG. 14(f) shows usage control specification using deontic logic.

A license behaves as an object with a set of functions that defines an interface by use of an enforcement mechanism that communicates or "uses" the license. The set of functions depend on the expressive and reasoning power of the license language. The more detailed the semantics of the license language, the more detailed the interface of the license.

For example, a license using a simple license language like $L_u$ supports a simple interface $IL_u = \{allowed(a), permissions( )\}$. The function allowed(a) determines whether $a \in \Sigma$ is permitted or not and returns a truth value accordingly. The function permissions( ) returns the set $\Sigma_p$. To address the challenge of interoperability, that is use of a license across different enforcement mechanisms, the license interfaces need to be standardized.

An enforcement mechanism enforces a license within a system. It interacts with the license and determines whether a particular action within a system must proceed or not. The mechanisms and programs that actually provide security and prevent the user from carrying out the action are left out of the definition of enforcement mechanism since they are totally dependent on the system in question and can be implemented in different ways according to the need of the application.

An enforcement mechanism is defined by the tuple EM=⟨A,iC,U⟩ with A being the set of action, iC being the context instance with the corresponding context type C, and U being the set of license functions used by enforcement mechanism, $U \subseteq F$, where F is the universal set of all license functions, as explained earlier.

All actions a∈A must be uniquely identifiable within the system. It must be possible for the system to determine whether or not an action has taken place. Two types of actions are defined, namely simple actions and complex actions. Simple actions are actions without any accompanying information. Complex actions are parameterized actions and contain additional information about the action such as duration of the action, or the amount of payments made in case the action is a payment action and so on. For the present discussion, the actions are restricted to simple actions. Introduction of complex actions leads to a certain set of challenges and are discussed below.

Every enforcement mechanism maintains an instance of the context iC and updates it with the latest values. The context instance maintains the most recent state of the system. The values carried by a context instance are used to determine whether or not the constraints in the restricted activities are satisfied. A context instance determines the state of the environment when a particular action is carried out, the subject and properties of the subject that carried out the action, and the resource and resource properties over which the action is performed.

An enforcement mechanism carries out enforcement by using the functions provided by licenses. An enforcement mechanism uses these functions to interact with a license.

Figure 15:
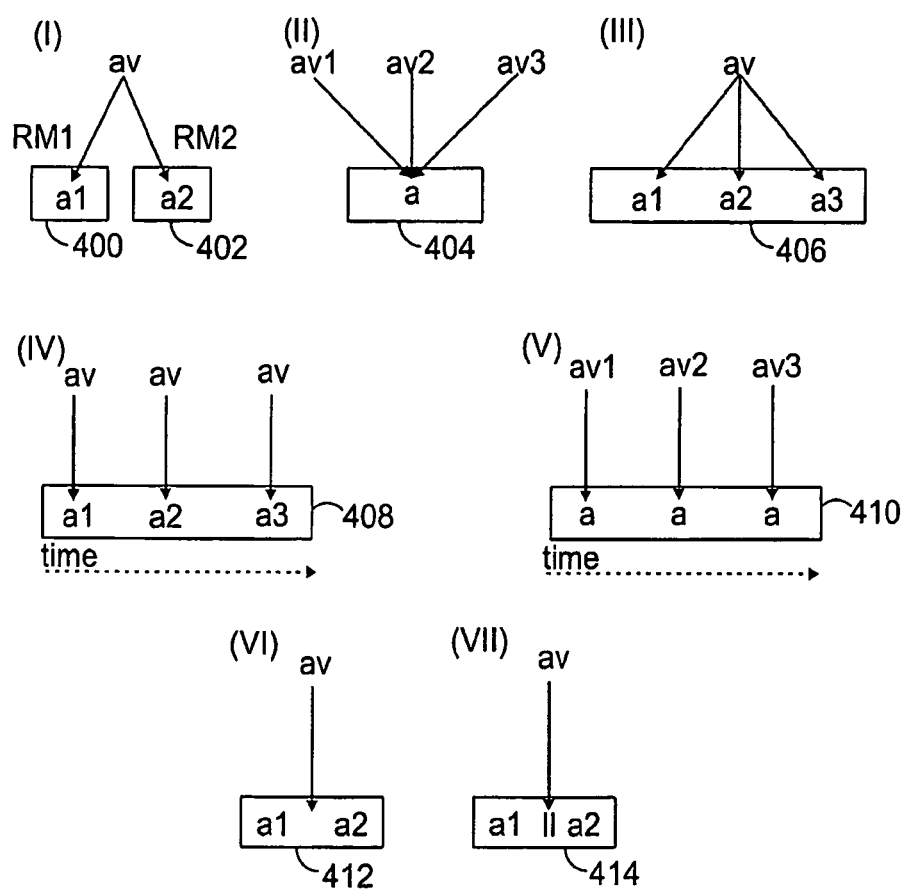
FIG. 15 illustrates a block diagram of different ways in which activities can be interpreted in an enforcement mechanism according to an embodiment of the present invention.
Figure 16:
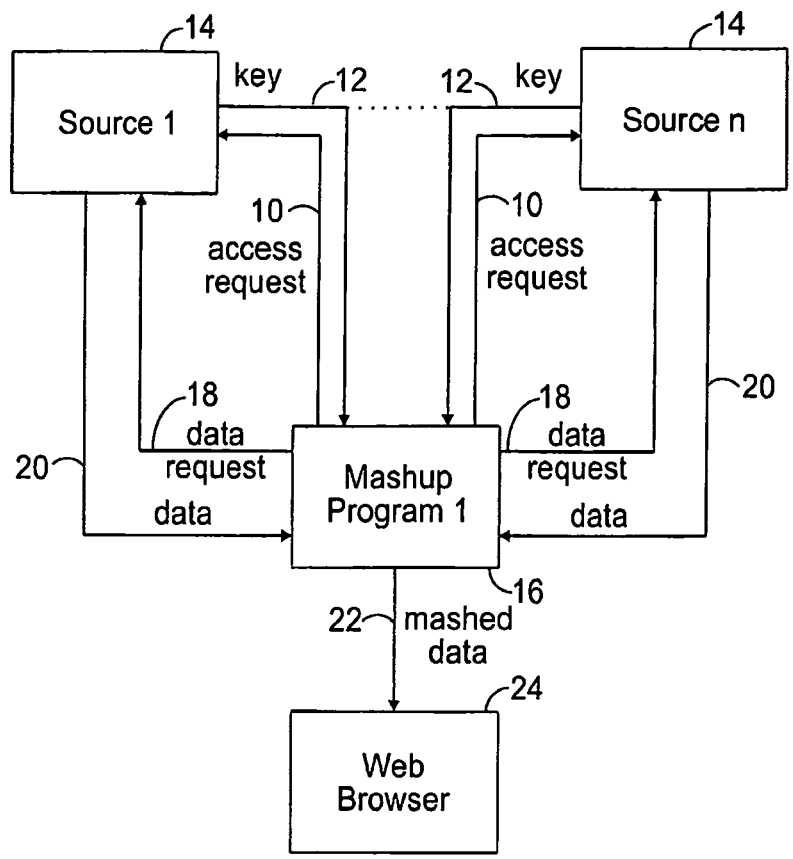
FIG. 16 illustrates a flowchart creating a conventional mashup using typical infrastructure.
Figure 17:
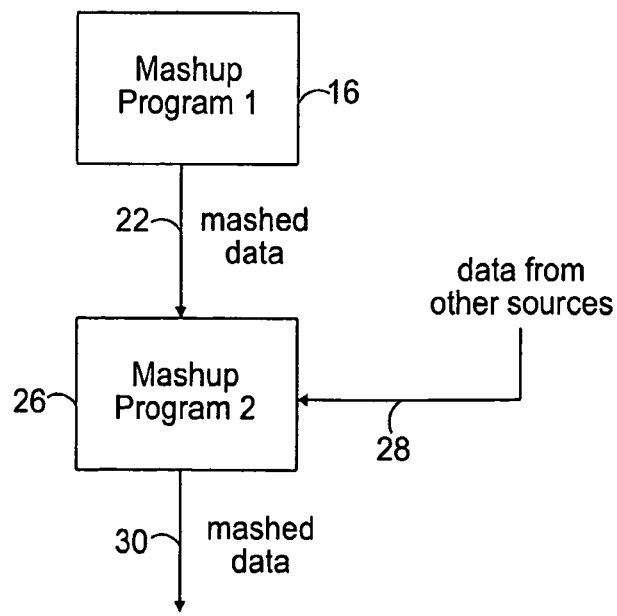
FIG. 17 illustrates a flowchart creating a conventional mashup using another mashup as a source.

FIG. 15 illustrates a block diagram of different ways in which activities can be interpreted in an enforcement mechanism according to an embodiment of the present invention. In scenario (i), a single activity (av) in interpreted differently in different enforcement mechanisms 400 and 402. In scenario (ii), multiple activities are interpreted as the same action in a given enforcement mechanism 404. In scenario (iii), a single activity is interpreted simultaneously as different actions within a given enforcement mechanism 406. In scenario (iv), a different interpretation of a single activity in a given enforcement mechanism 408 as time progresses is shown. In scenario (v), the same interpretation of different activities in a given enforcement mechanism 410 as time progresses is shown. In scenario (vi), an interpretation of an activity as a sequence of actions in a given enforcement mechanism 412 is shown. In scenario (vii), interpretation of an activity as simultaneous execution of actions in a given enforcement mechanism 414 is shown.

Actions are identifiable operations carried out in the user system. Activities are expression abstractions for actions in different systems. An interpreter may map activities to a set of actions defined in the enforcement mechanism. The interpreter may also determine how an activity is interpreted in a user system. The interpreter may be provided to the user system by the rights holder, or the user and rights holder may mutually agree on an interpretation. Formally, an interpreter is defined as follows.

For a given license lic=⟨RV,∈,I⟩ and an enforcement mechanism em=⟨Act,iC,U⟩, there exists an interpreter of the license within the enforcement mechanism that maps each activity in the license to a set of one or more actions in the enforcement mechanism. Let Acv={av|⟨av,CR⟩∈RV}, then the interpretation) of lic in em is defined by the function $t: Acv \to \{2^{Act} \setminus 0\}$. An interpreter for lic in em is defined by IT. An interpreter is used by the enforcement mechanism to determine what activities correspond to what actions.

An environment boolean function $f \in D^E$ is satisfied by an environment instance iE, denoted by iE|=f if and only if f evaluates to true under the values taken by environment properties in iE. The satisfaction of an environment constraint ($cr_e$) by an environment instance iE, denoted by iE|=$cr_e$, is calculated by induction on the structure of $cr_e$. Satisfaction of subject and resource constraints by subject and resource instances is defined similarly.

Let Act denote the set of identifiable actions identifiable in the enforcement mechanism. A restricted action is an action carried out under a certain restriction on the environment, subject and resource. A restricted action is defined by the tuple ⟨a,iE,iS,iR⟩, where a∈Act. Let Ract denote the set of restricted actions.

The interpretation of activities in terms of actions in the environment is defined by the interpretation function
$$t: Acv \to \{2^{Act} \setminus 0\}$$

Now, the concept of conformance between a restricted action and restricted activity is discussed. A restricted action conforms to a restricted activity if the constraints in the activity are satisfied by the environment, subject and resource instances, and the action representing the restricted action is the interpretation of the activity representing the restricted activity.

Let ra=⟨a,iEiS,iR⟩∈Ract and rv=⟨av,{$cr_e,cr_s,cr_r$}⟩∈Racv, then ra conforms to rv, denoted by ra∝rv, if and only if the following conditions are satisfied: (i) a∈t(av), (ii) iE|=$cr_e$, (iii) iS|=$cr_s$, (iv) iR|=$cr_r$.

There are two types of compatibilities, namely, compatibility of a restricted activity with respect to a context and compatibility of a license with respect to an enforcement mechanism.

Let the properties used in a given constraint cr be denoted by p(cr). Then, a given restricted activity rv=⟨av,{$cr_e,cr_s,cr_r$}⟩ is compatible with a given context C=⟨E,S,R⟩ denoted by rv⋈C, if the following conditions are satisfied: (i)p($cr_e$)⊆E, (ii)p($cr_s$)⊆S, (iii)p($cr_r$)⊆R.

Given a license lic=⟨E,∈,I⟩, and an enforcement mechanism em=⟨A,iC,U⟩, where C is the context of the instance iC, license lic is context compatible with the enforcement mechanism em, denoted by lic⋈$_c$em, if ∀rv∈E, rv⋈C. A lic is interface compatible with the enforcement mechanism em, denoted by lic⋈$^c$em, if U⊆I. Finally, lic is compatible with em, denoted by lic⋈em if lic⋈$^c$em and lic⋈em.

The type of environment, subject and resource used in a context depends on the application. No single type is able to satisfy the requirement of all the applications. Therefore, these entities are categorized in a hierarchical manner. Consider context $C=\langle E,S,R\rangle$ and context $C'=\langle E',S',R'\rangle$. Then, context C' inherits context C, denoted by $C' \trianglerighteq C$, if the following conditions are satisfied: (i) $E \subseteq E'$, (ii) $S \subseteq S'$, (iii) $R \subseteq R'$.

Let $em=\langle A,iC,U\rangle$ and $em'=\langle A',iC'U'\rangle$ be two enforcement mechanisms, such that $C' \trianglerighteq C$, then the following holds $lic \bowtie {}^c em \Rightarrow lic \bowtie {}^c em'$.

Consider license $lic=\langle E,\epsilon,I\rangle$ and $lic'=\langle E',\epsilon',I'\rangle$. Then lic' inherits lic, denoted by $lic' \trianglerighteq lic$, if $I \subseteq I'$. For licenses lic, lic' and enforcement mechanism em, given $lic' \trianglerighteq lic$, then $lic' \bowtie {}^r em \Rightarrow lic \bowtie {}^r em$. Such a modeling of interoperability and hierarchies makes it possible to dynamically determine whether a license is interoperable with an enforcement mechanism.

While the disclosure is susceptible to various modifications and alternative forms, specific exemplary embodiments thereof have been shown by way of example in the drawings and have herein been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A system for managing the separate control of resource usage and resource access for interoperability between and within open, distributed computing environments, comprising:
  a client computer comprising a processor including both a usage management mechanism and an enforcement mechanism, the usage management mechanism for managing resource usage according to a context, an event, and a license, the license including a set of actions and a policy specifying the conditions for whether or not the event may occur, and the enforcement mechanism for enforcing the license within the system according to how the license may be used;
  a server computer comprising a processor including a license generator managing resource access according to the policy using a license object and a context object, the license object identifying content usage policies and the context object identifying a structure and state of the computing environment,
  a model deployed within each of the open, distributed computing environments, the model using generic rights expression language lic, C, umm, iav, EM, for interoperability of the license within the computing environment,
    the license object represented by $lic=\langle Racv, \epsilon, I\rangle$ with Racv representing restricted actions in the computing environment according to the license, $\epsilon$ representing the license that is subject to the restricted actions, and I representing a set of functions supported by the license capturing the dynamic usage history in the computing environment associated with the policy,
    the context object represented by $C=\langle E, S, R\rangle$, with E representing a set of system environment properties, S representing a set of subject properties, and R representing a set of resource properties capturing the dynamic state of the computing environment through attributes of each entity within the computing environment;
    the usage management mechanism represented by $umm=\langle UI, Act, iC\rangle$ with UI representing functions used by the usage management mechanism to interact with the license, Act representing all actions enabled in the computing environments, and iC representing an instance of the context, wherein the usage management mechanism of the client computer queries the license object and the context object of the server computer for compatibility of the event with the policy and the client computer accepts the event and accesses content when the policy is compatible, wherein an activity by the client computer on the content generates an activity instance $iav=\langle acv, iC\rangle$ with acv representing the activity and iC representing the instance of the context;
    the enforcement mechanism represented by $EM=\langle A, iC, U\rangle$ with A representing the set of actions performed under the license, iC representing the instance of the context, and U representing functions of the license that are used by the enforcement mechanism to interact with the license, wherein the enforcement mechanism of the client computer prevents the activity on the content when the activity is not compatible with the set of actions of the license.

2. The system according to claim 1, wherein the context further comprises a constraint, wherein the constraint is a set of restrictions over the context.

3. The system according to claim 1, wherein the policy further comprises a policy state.

4. The system according to claim 1 further comprising an interface that is agreed to a priori between the client and the server.

5. The system according to claim 4, wherein the interface is a web application.

6. The system according to claim 1 further comprising two or more client computers, wherein the server computer performs a mashup of information from each client.

7. The system according to claim 1, wherein the system environment properties consist of: a date, a location, and internet protocol (IP) address.

8. The system according to claim 1, wherein the subject properties consist of: a subject identification number, a security clearance value.

9. The system according to claim 1, wherein the resource properties consist of: a resource identification number, a sensitivity level value.

10. The system according to claim 1, wherein the system environment properties consist of: a date, a location, and internet protocol (IP) address: the subject properties consist of: a subject identification number, a security clearance value; and the resource properties consist of: a resource identification number, a sensitivity level value.

11. The system according to claim 1, wherein each action of the set of actions corresponds to a verb within the license.

* * * * *